US009522330B2

(12) United States Patent
Pile et al.

(10) Patent No.: US 9,522,330 B2
(45) Date of Patent: Dec. 20, 2016

(54) THREE-DIMENSIONAL AUDIO SWEET SPOT FEEDBACK

(71) Applicant: MICROSOFT TECHNOLOGY LICENSING, LLC, Redmond, WA (US)

(72) Inventors: Shawn Pile, Burton-Upon-Trent (GB); Jon Vincent, Warwick (GB); Scott Henson, Edgbaston (GB); Jason Flaks, Redmond, WA (US); Avi Bar-Zeev, Sunnyvale, CA (US); John Tardif, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 263 days.

(21) Appl. No.: 13/725,572

(22) Filed: Dec. 21, 2012

(65) Prior Publication Data
US 2013/0208898 A1 Aug. 15, 2013

Related U.S. Application Data

(63) Continuation-in-part of application No. 12/903,610, filed on Oct. 13, 2010, now Pat. No. 8,767,968.

(51) Int. Cl.
*H04R 5/00* (2006.01)
*A63F 13/54* (2014.01)
(Continued)

(52) U.S. Cl.
CPC ............... *A63F 13/54* (2014.09); *A63F 13/10* (2013.01); *A63F 13/213* (2014.09);
(Continued)

(58) Field of Classification Search
CPC ............ H04R 5/04; A63F 13/42; A63F 13/54; A63F 13/213; H04S 7/303; H04S 2400/11; H04S 2420/01
(Continued)

(56) References Cited

U.S. PATENT DOCUMENTS 5,761,537 A 6/1998 Sturges et al.
6,167,288 A * 12/2000 Ishihara ........................ 455/566
(Continued)

OTHER PUBLICATIONS

Ward, Darren B., "Joint Least Squares Optimization for Robust Acoustic Crosstalk Cancellation", Retrieved at <<http://ieeexplore.ieee.org/stamp/stamp.jsp?tp=&arnumber=824710 >>, In IEEE Transactions on Speech and Audio Processing, vol. 8, Issue 2, Mar. 2000, pp. 211-215.
(Continued)

*Primary Examiner* — Paul S Kim
*Assistant Examiner* — Katherine Faley
(74) *Attorney, Agent, or Firm* — Brianna Hinojosa-Flores; Judy Yee; Micky Minhas

(57) ABSTRACT

A method for providing three-dimensional audio is provided. The method includes receiving a depth map imaging a scene from a depth camera and recognizing a human subject present in the scene. The human subject is modeled with a virtual skeleton comprising a plurality of joints defined with a three-dimensional position. A world space ear position of the human subject is determined based on the virtual skeleton. Furthermore, a target world space ear position of the human subject is determined. The target world space ear position is the world space position where a desired audio effect can be produced via an acoustic transducer array. The method further includes outputting a notification representing a spatial relationship between the world space ear position and the target world space ear position.

20 Claims, 11 Drawing Sheets

(51) Int. Cl.
*H04R 5/02* (2006.01)
*A63F 13/428* (2014.01)
*A63F 13/213* (2014.01)
*A63F 13/40* (2014.01)
*H04S 7/00* (2006.01)

(52) U.S. Cl.
CPC ............. *A63F 13/428* (2014.09); *H04R 5/02* (2013.01); *H04S 7/303* (2013.01); *A63F 2300/1012* (2013.01); *A63F 2300/6081* (2013.01); *H04S 2400/11* (2013.01); *H04S 2420/01* (2013.01)

(58) Field of Classification Search
USPC .......................................................... 381/17
See application file for complete search history.

(56) References Cited

U.S. PATENT DOCUMENTS

| | | | |
|---|---|---|---|
| 6,215,879 | B1 | 4/2001 | Dempsey |
| 6,243,476 | B1 | 6/2001 | Gardner |
| 6,499,025 | B1 | 12/2002 | Horvitz et al. |
| 6,504,933 | B1 | 1/2003 | Chung |
| 6,574,339 | B1 | 6/2003 | Kim et al. |
| 6,577,736 | B1 | 6/2003 | Clemow |
| 6,633,648 | B1 | 10/2003 | Bauck |
| 6,795,556 | B1* | 9/2004 | Sibbald et al. ................. 381/17 |
| 6,813,360 | B2 | 11/2004 | Gentle |
| 6,839,438 | B1 | 1/2005 | Riegelsberger et al. |
| 6,904,152 | B1 | 6/2005 | Moorer |
| 6,973,192 | B1 | 12/2005 | Gerrard et al. |
| 6,996,244 | B1 | 2/2006 | Slaney et al. |
| 7,068,792 | B1 | 6/2006 | Surazski et al. |
| 7,123,731 | B2 | 10/2006 | Cohen et al. |
| 7,231,054 | B1 | 6/2007 | Jot et al. |
| 7,664,270 | B2 | 2/2010 | Lee et al. |
| 7,916,039 | B2 | 3/2011 | Hess et al. |
| 8,085,958 | B1* | 12/2011 | Trautmann et al. .......... 381/310 |
| 8,170,222 | B2 | 5/2012 | Dunko |
| 8,428,269 | B1 | 4/2013 | Brungart et al. |
| 2001/0012367 | A1* | 8/2001 | Sotome et al. .................... 381/1 |
| 2003/0031333 | A1* | 2/2003 | Cohen et al. ................. 381/303 |
| 2003/0054881 | A1 | 3/2003 | Hedrick et al. |
| 2003/0132950 | A1 | 7/2003 | Surucu et al. |
| 2003/0223602 | A1 | 12/2003 | Eichler et al. |
| 2005/0010445 | A1 | 1/2005 | Krishnan et al. |
| 2005/0135629 | A1 | 6/2005 | Kim et al. |
| 2005/0163322 | A1 | 7/2005 | Kang et al. |
| 2006/0008091 | A1 | 1/2006 | Kim et al. |
| 2006/0072764 | A1 | 4/2006 | Mertens et al. |
| 2007/0035511 | A1 | 2/2007 | Banerjee et al. |
| 2007/0035561 | A1* | 2/2007 | Bachelder et al. ............ 345/633 |
| 2007/0127730 | A1 | 6/2007 | Kim et al. |
| 2007/0154019 | A1 | 7/2007 | Kim |
| 2007/0285419 | A1* | 12/2007 | Givon ........................... 345/420 |
| 2008/0025534 | A1* | 1/2008 | Kuhn ....................... H04S 7/30 381/300 |
| 2008/0144794 | A1 | 6/2008 | Gardner |
| 2009/0086982 | A1 | 4/2009 | Kulkarni et al. |
| 2009/0252338 | A1 | 10/2009 | Koppens et al. |
| 2009/0293012 | A1* | 11/2009 | Alter et al. ................... 715/810 |
| 2010/0034404 | A1* | 2/2010 | Dent ............................ 381/310 |
| 2010/0183156 | A1* | 7/2010 | Park et al. ...................... 381/17 |
| 2010/0260360 | A1 | 10/2010 | Strub |
| 2010/0290636 | A1* | 11/2010 | Mao ....................... H04S 7/304 381/74 |
| 2011/0188660 | A1 | 8/2011 | Xu et al. |
| 2011/0293129 | A1 | 12/2011 | Dillen et al. |
| 2012/0038739 | A1 | 2/2012 | Welch et al. |
| 2012/0093320 | A1 | 4/2012 | Flaks et al. |
| 2013/0208897 | A1 | 8/2013 | Vincent et al. |
| 2013/0208899 | A1 | 8/2013 | Vincent et al. |
| 2013/0208900 | A1 | 8/2013 | Vincent et al. |
| 2013/0208926 | A1 | 8/2013 | Vincent et al. |

OTHER PUBLICATIONS

Gardner, William G., "3-D Audio Using Loudspeakers", Retrieved at <<http://sound.media.mit.edu/Papers/gardner_thesis.pdf>>, Thesis Submitted to the Program in Media Arts and Sciences, School of Architecture and Planning in Partial Fulfillment of the Requirements for the Degree of Doctor of Philosophy at the Massachusetts Institute of Technology, Sep. 1997, pp. 153.

Algazi, et al., "The Cipic HRTF Database", Retrieved at <<http://sound.media.mit.edu/Papers/gardner_thesis.pdf>>, In IEEE Workshop on the Applications of Signal Processing to Audio and Acoustics, Oct. 23, 2001, pp. 4.

"Introduction to HRTFs", Retrieved at http://www.umiacs.umd.edu/~ramani/cmsc828d_audio/HRTF_INTRO.pdf>>, Retrieved Date: Jan. 14, 2013, pp. 36.

Zhang, Zhengyou., "Microsoft Kinect Sensor and Its Effect", Retrived at <<http://ieeexplore.ieee.org/stamp/stamp.jsp?arnumber=06190806>>Proceedings of IEEE Multimedia, vol. 19, Issue: 2, Apr. 2012, pp. 4-10.

Eckel, Gerhardi., "Immersive Audio-Augmented Environments The LISTEN Project", Retrieved at <<http://ieeexplore.ieee.org/stamp/stamp.jsp?tp=&arnumber=942112>>, Proceedings of the Fifth International Conference on Information Visualisation, Retrieved Date: May 14, 2012, pp. 571-573.

Yao, et al., "KinectedConference.2011", Retrieved at <<http://web.unedia.mit.edu/~liningy/sub_work/01_01.html>>, Retrieved Date: May 14, 2012, pp. 3.

Gardner, W., "3-D Audio Using Loudspeakers," Massachusetts Institute of Technology, Cambridge, MA, Sep. 1997, 153 pages.

Ward, D., "Joint Least Squares Optimization for Robust Acoustic Crosstalk Cancellation," IEEE Transactions on Speech and Audio Processing, vol. 8, No. 2, Canberra, ACT, Australia, Feb. 2000, 5 pages.

Duraiswami, R., "Introduction to HRTFs," Creation Date: Apr. 3, 2006, 36 pages.

Algazi, V.R. et al., "The Cipic HRTF Database," 2001 IEEE Workshop on Applications of Signal Processing to Audio and Acoustics, Davis, CA, Oct. 2011, 4 pages.

Brown, C. et al., "An Efficient HRTF Model for 3-D Sound," 1997 IEEE ASSP Workshop on Applications of Signal Processing to Audio and Acoustics, Oct. 19, 1997, 4 pages.

Lopez, J. et al., "3-D Audio With Dynamic Tracking for Multimedia Environments," 2nd COST-G6 Workshop on Digital Audio Effects (DAFx99), Dec. 9, 1999, 4 pages.

Gardner, W., "Spatial Audio Reproduction: Towards Individualized Binaural Sound," U.S. Frontiers of Engineering Symposium Program, Sep. 11, 2004, 13 pages.

Matsumura, T. et al., "Embedded 3D Sound Movement System based on Feature Extraction of Head-Related Transfer Function," IEEE Transactions on Consumer Electronics, vol. 51, No. 1, Feb. 2005, 6 pages.

Song, M. et al., "Personal 3D Audio System with Loudspeakers," IEEE International Conference on Multimedia and Expo (ICME), Jul. 19, 2010, 6 pages.

Wells, M., "Musical Sweet Spot for 3D Sound," BBC News Website, Available at http://news.bbc.co.uk/today/hi/today/newsid_9427000/9427892.stm, Available as Early as Mar. 19, 2011, Retrieved May 8, 2012, 3 pages.

Burnette, E., "Microsoft Releases Kinect for Windows SDK Beta," ZDNet Website, Available at http://www.zdnet.com/article/microsoft-releases-kinect-for-windows-sdk-beta/, Jun. 16, 2011, 7 pages.

Ackerman, E., "Microsoft Releases Kinect SDK, Roboticists Cackle With Glee," IEEE Spectrum Website Blog, Available at http://spectrum.ieee.org/automaton/robotics/diy/microsoft-releases-kinect-sdk-roboticists-cackle-with-glee, Jun. 17, 2011, 2 pages.

Song, M. et al., "An Interactive 3-D Audio System With Loudspeakers," IEEE Transactions on Multimedia, vol. 13, No. 5, Oct. 2011, 12 pages.

(56) References Cited

OTHER PUBLICATIONS

Boyce, K., "Spatial Audio Generation from Portable Devices (Part 2)," EET Times-India Website, Available at https://www.google.com/url?sa=t&rct=j&q=&esrc=s&source=web&cd=3&cad=rja&uact=8&ved=0CCcQFjACahUKEwj4-u2K643IAhVXfogKHRoVDjE&url=http%3A%2F%02Fm.eetindia.co.in%2FSTATIC%2FPDF%2F201203%2FEEIOL_2012MAR30_AMP_TA_01.pdf%3FSOURCES%3DDOWNLOAD&usg=AFQjCNGA_F0RQhB7CQ1kKevHZCmxZdyy-w, Mar. 16, 2012, 4 pages.

* cited by examiner

THREE-DIMENSIONAL AUDIO SWEET SPOT FEEDBACK

CROSS REFERENCE TO RELATED APPLICATIONS

This application is a continuation-in-part of U.S. patent application Ser. No. 12/903,610, filed Oct. 13, 2010, the entirety of which is hereby incorporated herein by reference.

BACKGROUND

Humans are able to recognize the originating position of a sound based on differences between audio information received at each ear. Typical audio systems, such as surround sound systems, include a finite number of loudspeakers positioned around one or more listeners to provide some level of directionality to the sound experienced by the listener. However, the extent of directionality is usually limited by the number and positioning of speakers, as well as the position of the listener relative to the speakers.

SUMMARY

A method for providing three-dimensional audio is provided. The method includes receiving a depth map imaging a scene from a depth camera and recognizing a human subject present in the scene. The human subject is modeled with a virtual skeleton comprising a plurality of joints defined with a three-dimensional position. A world space ear position of the human subject is determined based on the virtual skeleton. Furthermore, a target world space ear position of the human subject is determined. The target world space ear position is the world space position where a desired audio effect can be produced via an acoustic transducer array. The method further includes outputting a notification representing a spatial relationship between the world space ear position and the target world space ear position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
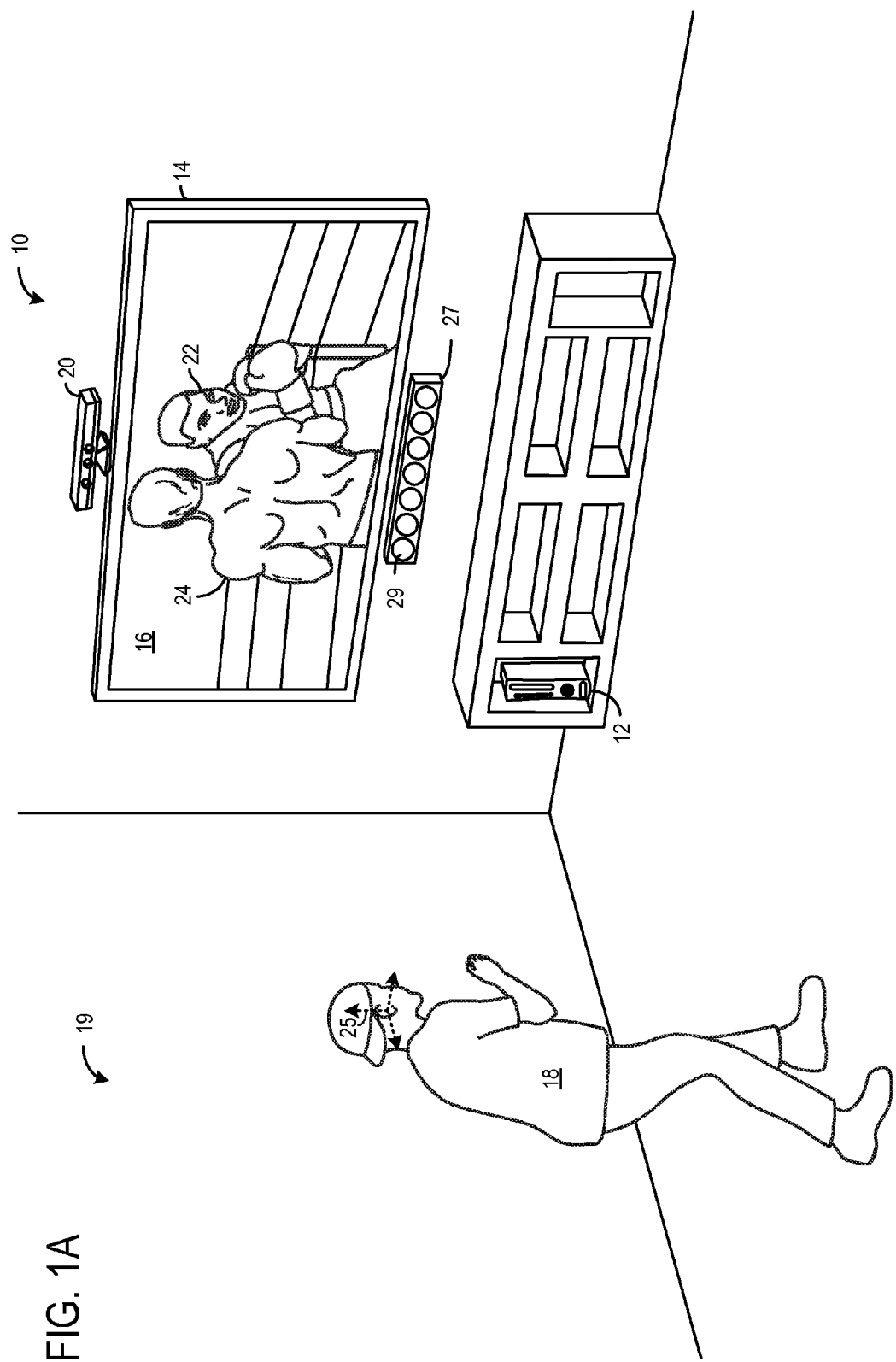
FIGS. 1A and 1B show an example depth analysis system imaging a human subject in accordance with an embodiment of the present disclosure.

Humans have the ability to recognize the source of a sound (sometimes referred to as "sound localization") using their ears, even absent additional (e.g., visual) cues, by comparing aural cues received at both ears. Such aural cues may include, for example, time-differences and level-differences of sounds between ears, spectral information, etc. In other words, sound localization may rely on the differences (e.g., time and/or intensity) between the sounds received at both ears, similar to a person's ability to determine visual depth based on the difference(s) in visual information received at each eye.

In real-world situations, sounds emanate from a particular location (e.g., from a speaker, from a person's mouth, etc.). As such, in order to provide a more "life-like" experience, it may be desirable in some instances (e.g., during video game play, etc.) to enable a listener of a sound system to perceive that sounds produced by one or more loudspeakers appear to originate at a particular location in three-dimensional space. However, typical audio systems (e.g., "surround sound" systems) do not include output devices (e.g., loudspeakers) at each possible location in three-dimensional space from which sounds could originate.

Typical three-dimensional audio systems may therefore utilize headphones (sometimes referred to as a "headset") comprising, for each ear, one or more acoustic transducers configured to provide audio output to the ear. As used herein, the term "three-dimensional audio output" refers to audio output that provides the illusion that sound is coming from a location in three-dimensional space that may or may not correspond to the location of the speaker(s) producing the sound. Since sound localization is based on the difference(s) between sound received at each ear, such a configuration may provide favorable control over the audio output perceived at each ear, and thus over a given three-dimensional audio effect. However, headphone use may not be desirable for various use case scenarios.

Other three-dimensional audio systems may utilize a plurality of speakers oriented around the listener in order to provide three-dimensional audio effect(s). Such systems may utilize a plurality of speakers positioned near predefined locations (e.g., front speakers oriented at 30 degrees to the user) and/or rely on the user being located in a particular location (sometimes referred to as a "sweet spot") in order to provide the desired effect. In contrast to headphones-based systems, loudspeaker-based systems are, by design, configured such that audio output from the loudspeakers is detectable by both ears of a human subject. Therefore, additional processing may be utilized to control the audio perceived by each ear, and thus to control the three-dimensional audio effect. For example, systems may utilize one or more "crosstalk cancellation" mechanisms configured such that a first audio signal (e.g., left channel) is delivered to a first ear (e.g., left ear) and a second audio signal (e.g., right channel) is delivered to a second ear (e.g., right ear) while substantially attenuating the delivery of the first signal to the second ear and delivery of the second audio signal to the first ear.

Regardless of the audio output mechanisms, the provision of three-dimensional audio may be based on a head-related transfer function "HRTF" and/or head-related impulse response "HRIR" to create the illusion that sound is originating from a particular location in 3D space. The HRTF describes how a given sound wave input is filtered by the diffraction and reflection properties of the head and pinna before the sound reaches the eardrum and inner ear. In other words, an HRTF may be defined based on the difference between a sound in free air and the sound as it arrives at the eardrum. An HRTF may be closely related to the shape of a person's head and physical characteristics of their ears, and may therefore vary significantly from one human to the next. It will therefore be appreciated that it may be desirable to accurately determine an HRTF for a given human subject in order to provide a "believable" three-dimensional audio output.

For example, computer vision techniques may be usable to track and/or model a human subject in order to provide such an output. As described in more detail below, a tracking device including a depth camera and/or other sensors is used to three-dimensionally image one or more observed humans. Depth information acquired by the tracking device may be used to model and track the one or more observed humans as they move about an environment. In particular, the observed human(s) may be modeled as a virtual skeleton or other machine-readable body model. The virtual skeleton or other machine-readable body model may be used as an input to effect control over a cooperating computing device and/or over applications presented thereby. Furthermore, such a configuration may allow the provision of three-dimensional audio to one or more human subjects via a determination of the position and/or pose of one or human subject(s). Example embodiments of three-dimensional audio effects that may be provided via such a configuration will be discussed in greater detail below.

An example use case scenario including such a tracking device is described with reference to FIG. 1A, which shows a nonlimiting example of a depth analysis system 10. In particular, FIG. 1A comprises a computer gaming system 12 that may be used to play a variety of different games, play one or more different media types, and/or control or manipulate non-game applications. In some embodiments, gaming system 12 may be operatively coupled (e.g., via one or more wireless and/or wired connections) to display 14 such that the display may be used to present visuals (e.g., video game 16) to the human subject(s), such as game player 18. Furthermore, gaming system 12 may be operatively coupled to tracking device 20, which may be used to visually monitor the one or more game players, and to one or more audio output devices (e.g., acoustic transducer array 27) usable to provide three-dimensional audio output. It will be appreciated that the example depth analysis system 10 shown in FIG. 1A is nonlimiting, as depth analysis may be utilized by a variety of computing systems to effect a variety of control without departing from the scope of this disclosure. For example, though illustrated as physically-separate bodies, it will be appreciated that, in some embodiments, one or more components of depth analysis system 10 (e.g., tracking device 20, gaming system 12, and/or display 14) may be housed by a shared housing (e.g., "tabletop" device, mobile device, etc.).

The depth analysis system may be used to recognize, analyze, and/or track one or more human subjects that are present in scene 19, and FIG. 1A illustrates a scenario in which tracking device 20 tracks game player 18 such that the movements of game player 18 may be interpreted by gaming system 12. In particular, the movements of game player 18 are interpreted by depth analysis system 10 so as to effect control over video game 16 provided by gaming system 12. In other words, the movements of game player 18 may be usable to control the game. It will be appreciated that the movements of game player 18 may be interpreted as virtually any type of game and/or non-game control.

Figure 1B:
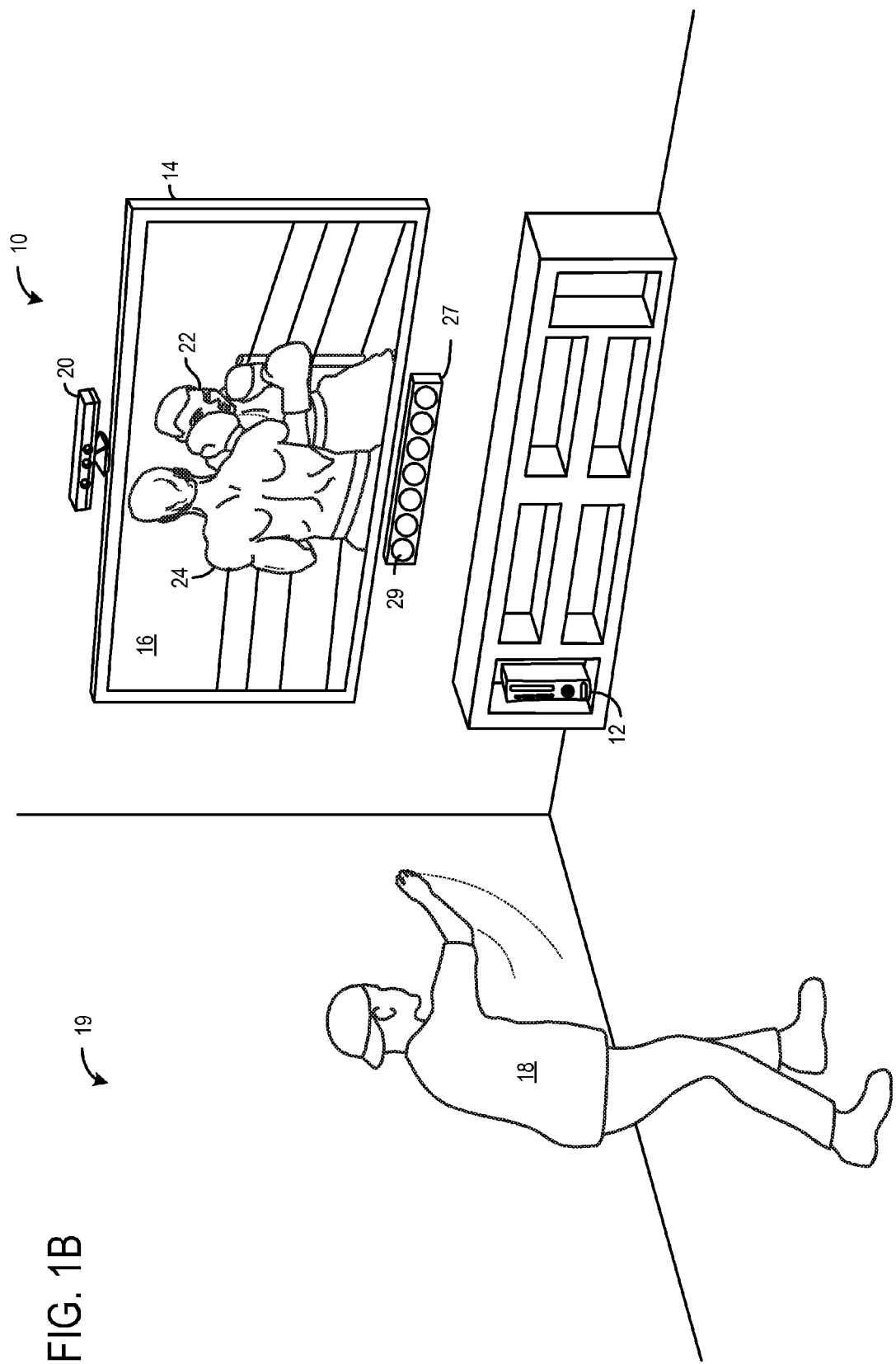

Continuing with the example scenario of FIG. 1A, gaming system 12 visually presents video game 16 (e.g., boxing game) comprising boxing opponent 22 to game player 18, and further presents player avatar 24 that is controlled via movement of gaming player 18. For example, as shown in FIG. 1B, game player 18 may throw a punch in world space to effect throwing of a punch in virtual space by player avatar 24. In other words, player avatar 24 may throw a punch that strikes boxing opponent 22 responsive to game player 18 throwing a punch in world space. As used herein, the term "world space" refers to the space in which human subject 18 is located. Alternately, the term "virtual space" refers to the "space" provided by gaming system 12 (e.g., virtual boxing ring of video game 16). It will thus be appreciated that, generally speaking, gaming system 12 may be configured to utilize information received from tracking device 20 regarding the movement, position, and/or pose of game player 18 in world space in order to effect control over video game 16 (e.g., player avatar 24 of video game 16) in virtual space.

Returning to FIG. 1A, other movements by game player 18 that may be interpreted by gaming system 12 and/or tracking device 20 to effect control over player avatar 24 include, but are not limited to, bobs, weaves, shuffles, blocks, jabs, and/or various power punches. Furthermore, some movements may be interpreted as controls that serve purposes other than controlling player avatar 24. For example, the player may use movements to end, pause, or save a game; select a level; view high scores; communicate with a friend; etc. As mentioned above, it will be appreciated that information provided by tracking device 20 regarding the human subject(s) and/or the object(s) present in scene 19 may be utilized in any suitable manner.

For example, in order to provide three-dimensional audio to one or more human subjects, it may be desirable to determine the position and/or pose of the human subject(s). Specifically, it may be desirable to determine the world space ear position 25 (schematically illustrated as a three-dimensional axes) of human subject 18 and/or of one or more other human subjects present in scene 19. As used herein, the term "world space ear position" refers to the position and/or orientation of one or both ears of a given human subject in world space. As will be discussed in greater detail below, by recognizing the world space ear position for each human subject, a three-dimensional audio output may be provided via an acoustic transducer array 27 or other sound source in order to provide a desired three-dimensional audio effect. Although acoustic transducer array 27 is illustrated as comprising a plurality of acoustic transducers 29 of substantially equivalent size and arranged in a substantially linear arrangement, it will be appreciated that such a configuration is provided for the purpose of example and is not intended to be limiting in any manner. For example, in some embodiments, the acoustic transducer array may comprise one or more acoustic transducers configured to output high-frequency sound, one or more acoustic transducers configure to output mid-frequency sound, and one or more acoustic transducers configured to output low-frequency sound. In other embodiments, discrete speakers at different locations may be used to provide a desired three-dimensional audio effect. As another example, although acoustic transducers 29 are illustrated as having substantially equivalent orientations, it will be appreciated that in some embodiments, one or more acoustic transducers 29 may have different orientations. In general, the type, position, and orientation of acoustic transducers may be selected to achieve a suitable crosstalk cancellation effect at one or more world space locations.

In some embodiments, objects (e.g., furniture, pets, etc.) other than the human subject(s) may be imaged via tracking device 20, and thus modeled and/or tracked in order to effect control over gaming system 12. In some embodiments, such objects may be modeled and tracked independently of human subjects, whereas objects held by a game player also may be modeled and tracked such that the motions of the player and the object are cooperatively analyzed to adjust and/or control parameters of a game. For example, the motion of a player holding a racket and/or the motion of the racket itself may be tracked and utilized for controlling an on-screen racket in a sports game.

Furthermore, as will be discussed in greater detail below, it may be desirable to track and/or model one or more objects present in scene 19 in order to provide a corresponding three-dimensional audio output via acoustic transducer array 27. For example, in some embodiments, audio output may be provided by acoustic transducer array 27 such that one or more sounds appear to originate from one or more objects present in scene 19. Furthermore, in some embodiments, object tracking/modeling may be usable to determine one or more characteristics (e.g., layout, component materials, etc.) of scene 19 in order to provide the desired three-dimensional audio effect.

As previously mentioned, the illustrated boxing scenario is provided to demonstrate a general concept, and the imaging, and subsequent modeling, of human subject(s) and or object(s) within a scene may be utilized in a variety of different applications (e.g., providing three-dimensional audio) without departing from the scope of this disclosure.

Figure 2:
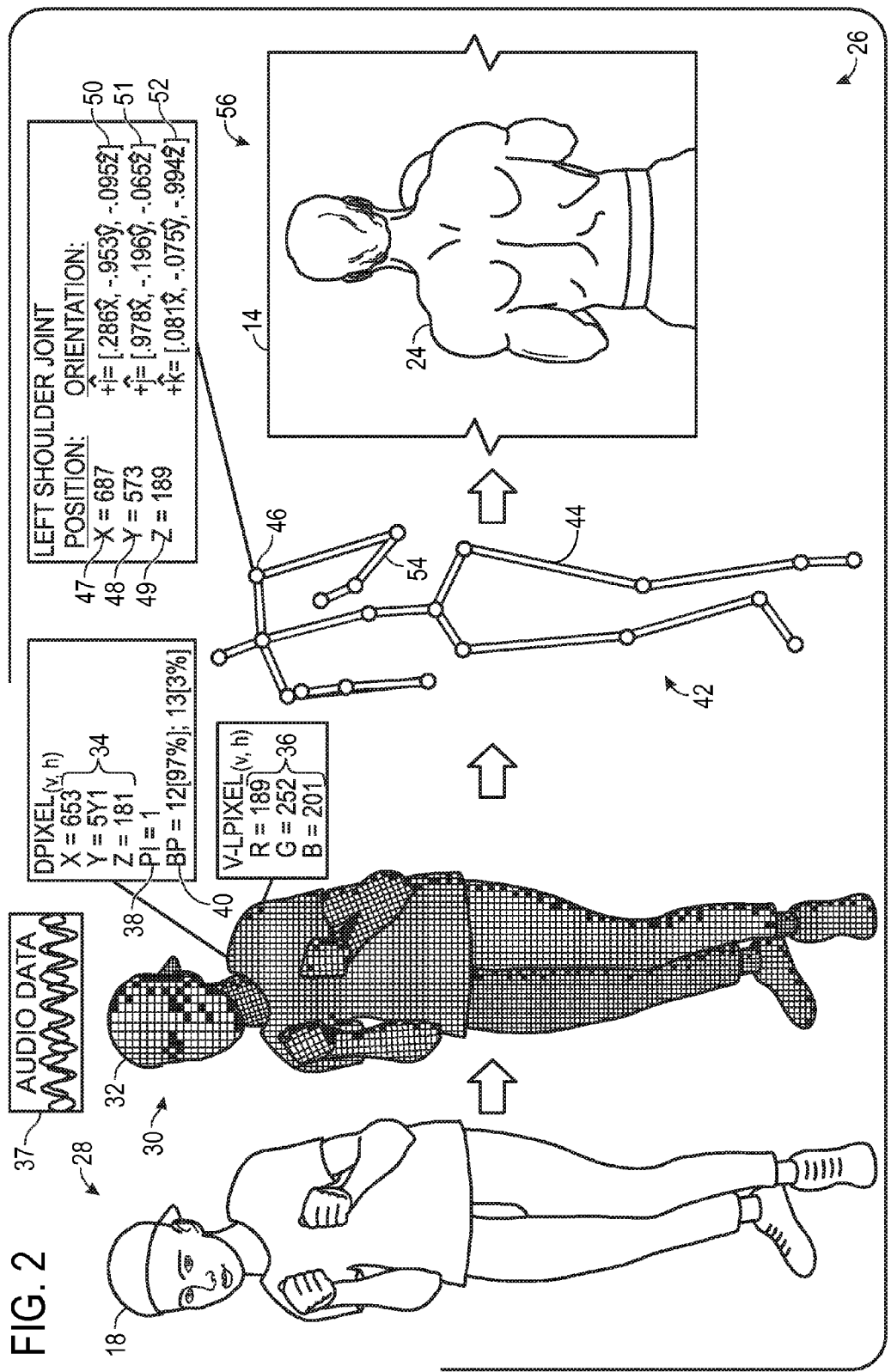
FIG. 2 schematically shows a nonlimiting example of a skeletal tracking pipeline in accordance with an embodiment of the present disclosure.

FIG. 2 graphically shows a simplified skeletal tracking pipeline 26 of a depth analysis system (e.g., depth analysis system 10 of FIGS. 1A and 1B) that may be used to find a world space ear position. It will be appreciated that skeletal tracking pipeline 26 may be implemented on any suitable computing system without departing from the scope of this disclosure. Furthermore, skeletal tracking pipelines may include additional and/or different steps than those illustrated via skeletal tracking pipeline 26 without departing from the scope of the present disclosure.

Beginning at 28, FIG. 2 illustrates game player 18 of FIG. 1A from the perspective of tracking device 20. As mentioned above, tracking devices, such as tracking device 20, may include one or more sensors (e.g., one or more depth cameras and/or one or more color image sensors) configured to image a scene (e.g., scene 19) including one or more human subjects (e.g., game player 18) and/or one or more objects.

At 30, a schematic representation 32 of the information output (e.g., depth map, raw infrared information, and/or color information comprising one or more pixels) by the tracking device is shown. It will be appreciated that the information provided by said tracking device may vary depending on the number and types of sensors included in the tracking device and/or on the specific use case scenario. In order to elucidate a few of the possible sensor configurations, the example tracking device of FIG. 2 includes a depth camera, a visible light (e.g., color) camera, and a microphone. However, in some embodiments, additional and/or different sensors may be utilized.

Each of the one or more depth cameras may be configured to determine the depth of a surface in the observed scene relative to the depth camera. Example depth cameras include, but are not limited to, time-of-flight cameras, structured light cameras, and stereo image cameras. FIG. 2 schematically shows the three-dimensional coordinates 34 (e.g., x, y, and z coordinates) observed for a depth pixel "DPixel[v,h]" of a depth camera of tracking device 20. Although such values are illustrated for a single pixel, it will be appreciated that similar three-dimensional coordinates may be recorded for every pixel of the depth camera. In other words, the depth camera may be configured to output a "depth map" comprising a plurality of pixels, wherein the depth map includes three-dimensional coordinates for all of the pixels. The three-dimensional coordinates may be determined via any suitable mechanisms or combination of mechanisms, and further may be defined according to any suitable coordinate system, without departing from the scope of this disclosure.

FIG. 2 schematically shows the red/green/blue "RGB" color values 36 observed for a pixel "V-LPixel[v,h]" of a visible-light camera of tracking device 20. Although such values are illustrated for a single pixel, it will be appreciated that the color image sensor may be configured to output color information comprising similar RGB color values for every pixel discernible by the visible-light camera. It will be further appreciated that the RGB color values may be determined via any suitable mechanism(s) without departing from the scope of this disclosure. Furthermore, in some embodiments, one or more color image sensors may share components (e.g., lenses, semiconductor dies, mechanical structures, etc.) with one or more depth cameras.

Although the depth information and the color information are illustrated as including an equivalent number of pixels (i.e., equivalent resolutions), it will be appreciated that the depth camera(s) and the color image sensor(s) may each comprise different resolutions without departing from the scope of the present disclosure. Regardless of the individual resolutions, it will be appreciated that one or more pixels of the color information may be registered to one or more pixels of the depth information. In other words, the tracking device (e.g., tracking device 20) may be configured to provide both color information and depth information for each "portion" of an observed scene (e.g., scene 19) by considering the pixel(s) from the visible light camera and the depth camera (e.g., V-LPixel[v,h] and DPixel[v,h]) in registration with each portion.

Furthermore, in some embodiments, one or more acoustic sensors (e.g., microphones) may be used to determine directional and/or non-directional sounds produced by an observed human subject and/or by other sources. For example, as will be discussed in greater detail below, the acoustic sensors may be usable to determine a spatial relationship between an acoustic transducer array (e.g., acoustic transducer array 27 of FIGS. 1A and 1B) and one or more of a tracking device (e.g., tracking device 20) and a computing device (e.g., gaming system 12). For the purpose of illustration, FIG. 2 schematically shows audio data 37 recorded by one or more acoustic sensors of tracking device 20. Such audio data may comprise any combination of analog and/or digital data, and may be determined via any suitable mechanism(s) without departing from the scope of this disclosure.

The data received from the one or more sensors may take the form of virtually any suitable data structure(s), including, but not limited to, one or more matrices comprising three-dimensional coordinates for every pixel of the depth map provided by the depth camera, RGB color values for every pixel of the color information provided by the visible-light camera, and/or time resolved digital audio data provided by the acoustic sensors. While FIG. 2 depicts a single instance of depth information, color information, and audio information, it is to be understood that the human subject(s) and/or the object(s) present in a scene may be continuously observed and modeled with regular and/or irregular frequency (e.g., at 30 frames per second). In some embodiments, the collected data may be made available via one or more Application Programming Interfaces (APIs) and/or further analyzed as described below.

In some embodiments, the tracking device and/or cooperating computing system may analyze the depth map to distinguish human subjects and/or other targets that are to be tracked from "non-target" elements in a given frame. As such, each pixel of the depth map may be assigned a player index 38 that identifies the pixel as imaging either a particular target or a non-target element. For example, the one or more pixels corresponding to a first player may each be assigned a player index equal to one, the one or more pixels corresponding to a second player may be assigned a player index equal to two, and the one or more pixels that do not correspond to a target player may be assigned a player index equal to zero. In some embodiments, similar indices may be used to distinguish various target objects instead of, or in addition to, the player indices. It will be appreciated that indices may be determined, assigned, and saved in any suitable manner without departing from the scope of this disclosure.

In some embodiments, a tracking device and/or cooperating computing system may further analyze the pixels of the depth map corresponding to one or more human subjects in order to determine what anatomical structure(s) (e.g., ear, arm, leg, torso, etc.) of said subject(s) are likely imaged by a given pixel of the depth map and/or color information. It will be appreciated that various mechanisms may be used to assess which anatomical structure of a human subject that a particular pixel is likely imaging. For example, in some embodiments, each pixel of the depth map corresponding to an appropriate player index may be assigned an anatomical structure index 40. The anatomical structure index may include, for example, a discrete identifier, confidence value, and/or probability distribution indicating the one or more anatomical structures that a given pixel is likely imaging. As with the above-described player indices and object indices, it will be understood that such anatomical structure indices may be determined, assigned, and saved in any suitable manner without departing from the scope of this disclosure.

As one nonlimiting example, one or more machine-learning mechanisms may be utilized to assign each pixel an anatomical structure index and/or probability distribution. Such machine-learning mechanisms may analyze a given human subject using information learned from a prior-trained collection of known poses. In other words, during a supervised training phase, a variety of different people are observed in a variety of different poses, and human trainers provide ground truth annotations labeling different machine-learning classifiers in the observed data. The observed data and annotations are thus used to generate one or more machine-learning algorithms that map inputs (e.g., observation data from a tracking device) to desired outputs (e.g., anatomical structure indices for the one or more relevant pixels).

As mentioned above, it may be desirable to model each human subject via a virtual skeleton. For example, at 42, FIG. 2 shows a schematic representation of a virtual skeleton 44 that provides a machine-readable representation of game player 18. Although virtual skeleton 44 is illustrated as including twenty virtual joints (i.e., head, shoulder center, spine, hip center, right shoulder, right elbow, right wrist, right hand, left shoulder, left elbow, left wrist, left hand, right hip, right knee, right ankle, right foot, left hip, left knee, left ankle, and left foot), it will be appreciated that virtual skeleton 44 is provided for the purpose of example and that virtual skeletons may include any number and configuration of joints without departing from the scope of the present disclosure.

The various skeletal joints may correspond to actual joints of a human subject, centroids of various anatomical structures, terminal ends of a human subject's extremities, and/or points without a direct anatomical link to the human subject. As each joint of the human subject has at least three degrees of freedom (e.g., world space x, y, z), each joint of the virtual skeleton is therefore defined with a three-dimensional position. For example, as illustrated, left shoulder virtual joint 46 is defined with x-coordinate position 47, y-coordinate position 48, and z-coordinate position 49. The position of each of the joints may be defined relative to any suitable origin and/or via any suitable coordinate system (e.g., Cartesian, cylindrical, spherical, etc.). As one example, the three-dimensional position of the tracking device may serve as the origin, and thus all joint positions may be defined relative to the tracking device. However, joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or previously-defined anatomical and kinetic information to determine one or more skeleton(s) that closely model a human subject. For example, the above-described anatomical structure indices may be used to determine the three-dimensional position of each skeletal joint. As another example, in some embodiments, the virtual skeleton may be at least partially based on one or more pre-defined skeletons (e.g., skeletons corresponding to gender, height, body type, etc.).

Furthermore, it will be appreciated that in some scenarios, it may be desirable to determine the orientation of one or more joints. For example, a joint orientation may be used to further define one or more of the virtual joints. Whereas joint positions may describe the position of joints, and thus of virtual bones that span between joints, joint orientations may describe the orientation of such joints and virtual bones at their respective positions. As an example, the orientation of a wrist joint may be used to describe if a hand located at a given position is facing up or down. As another example, which will be described in greater detail below, the orientation of one or more joints (e.g., head and/or neck joints) may be usable to determine the orientation of a human subject's head, and thus to determine a head-related transfer function "HRTF" of the human subject. The position and/or orientation of one or more joints, alternatively or additionally, may be useable to estimate a world space ear position (e.g., by estimating position relative to head joint). The position and/or orientation of one or more joints, alternatively or additionally, may be useable to locate an area of a depth map that is to be examined to find the observed world space ear position.

Joint orientations may be encoded, for example, via one or more normalized, three-dimensional orientation vectors. Said orientation vector(s) may represent the orientation of a joint relative to the tracking device or one or more other references (e.g., one or more other joints). Furthermore, the orientation vector(s) may be defined in terms of a world space coordinate system or another suitable coordinate system (e.g., the coordinate system of another joint). In some embodiments, joint orientations also may be encoded via other suitable representations, including, but not limited to, quaternions and/or Euler angles.

Continuing with the example virtual skeleton 44 of FIG. 2, left shoulder joint 46 is defined with orthonormal orientation vectors 50, 51, and 52. However, in other embodiments, a single orientation vector may be used to define a joint orientation, though the orientation vector(s) may be calculated in any suitable manner without departing from the scope of this disclosure.

Joint positions, orientations, and/or other information may be encoded in any suitable data structure(s). Furthermore, the position, orientation, and/or other parameters associated with any particular joint may be made available via one or more APIs. For example, said APIs may be usable by one or more applications (e.g., video game 16 of FIGS. 1A and 1B) presented by a cooperating computing device (e.g., gaming system 12) in order to effect control over the application(s) and/or the computing device.

As seen in FIG. 2, virtual skeleton 44 may optionally include a plurality of virtual bones (e.g. left forearm bone 54). These various skeletal bones may extend from one skeletal joint to another and may correspond to actual bones, limbs, or portions of bones and/or limbs of a human subject, and the joint orientations discussed herein may be applied to these bones. For example, as mentioned above, a neck orientation may be used to define a head orientation.

At 56, FIG. 2 shows display 14 visually presenting avatar 24. In some embodiments, virtual skeleton 44 may be used to render avatar 24, and, since virtual skeleton 44 changes poses as human subject 18 changes poses, avatar 24 may mimic the movements of human subject 18. It is to be understood, however, that a virtual skeleton may be used to effect additional and/or alternative control without departing from the scope of this disclosure.

Figure 3:
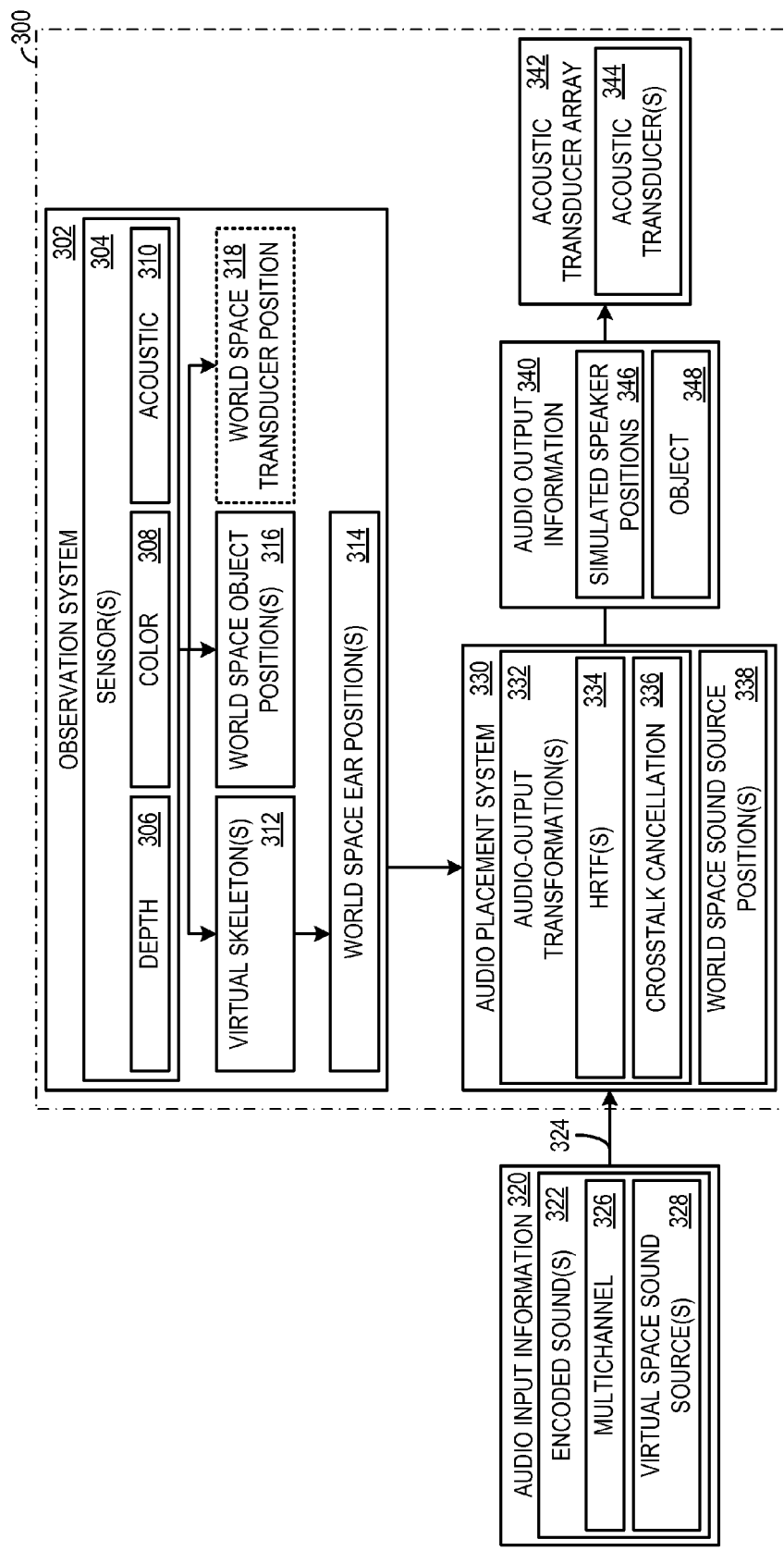
FIG. 3 schematically shows a non-limiting example of a three-dimensional audio system in accordance with an embodiment of the present disclosure.

Turning now to FIG. 3, an example of a three-dimensional audio system 300 for providing three-dimensional audio is shown. System 300 includes observation system 302 comprising one or more sensors 304. Sensors 304 may include, for example, one or more depth sensors 306 (e.g., depth cameras), one or more color image sensors 308 (e.g., color still cameras, color video cameras, etc.), and/or one or more acoustic sensors 310 (e.g., microphones).

As mentioned above and as will be discussed in greater detail below, information provided by the one or more sensors 304 may be usable to identify one or more human subject(s) present in a scene, and thus to model each of said subjects with virtual skeleton 312 or other suitable body model. The one or more skeletons 312 may subsequently be usable to determine world space ear position 314 for each of the human subjects. Such information may be further usable to determine world space object position 316 for one or more objects present in the scene. Furthermore, in some embodiments, transducer array 342 may be coupled to sensors 304 such that the position and/or orientation of the transducer array is known (e.g., integrated within a shared housing). However, in other embodiments where said elements are not integrated, it will be appreciated that information from sensors 304 may be further usable to determine world space transducer position 318 of the acoustic transducer array. As used herein, the term "world space transducer position" refers to the position and/or orientation of an acoustic transducer array in world space.

System 300 is further configured to receive, via audio input 324 (e.g., one or more wired or wireless connections to an external device, and/or one or more internal connections), audio input information 320 encoding sounds 322. In other words, audio input information 320 may be provided by system 300 (e.g., audio information corresponding to a video game provided by system 300) and/or may be provided by one or more other devices (e.g., DVD players, etc.) operatively coupled via audio input 324 to system 300. In some embodiments, audio input 324 may receive multichannel audio information 326 (e.g., "5.1." information), wherein the audio information encodes channel-specific sounds. In some embodiments (e.g., where system 300 is presenting an interactive digital environment such as a video game), audio input information 320 may include sound(s) corresponding to one or more virtual space sound sources 328 (e.g., in-game elements). Examples of audio input information will be discussed in greater detail below with reference to FIGS. 5-9. It will be appreciated that audio input information 320 is presented for the purpose of example, and that system 300 may be configured to provide three-dimensional audio based on any suitable audio input information.

System 300 further includes audio placement system 330 configured to produce three-dimensional audio output information from audio input information 320 via one more audio-output transformations 332 based on information from observation system 302. As used herein, the term "audio-output transformations" refer to any mechanism or combination of mechanisms configured to produce (e.g., via filtering, delaying, amplifying, inverting, and/or other manipulation) a three-dimensional audio output from audio input information (e.g., audio input information 320). For example, audio-output transformations 332 may include HRTF 334 for each human subject. As another example, the audio transformations may include one or more crosstalk cancellation transformations 336 described above and configured to provide control over the audio signal provided to each ear of the one or more human subject(s). Furthermore, in some embodiments, audio placement system 330 may be configured to determine world space sound source position 338. Such a configuration will be discussed in greater detail below with reference to FIG. 5.

Accordingly, audio placement system 330 is configured to provide audio output information 340 to acoustic transducer array 342 including one or more acoustic transducers 344. It will be understood that the acoustic transducer array may include a plurality of discrete devices (e.g., a plurality of loudspeakers oriented around the human subject(s)) and/or may include a single device (e.g., a "soundbar" including a plurality of acoustic transducers in the same housing). As will be described with reference to the example use case scenarios of FIGS. 5-9, such audio output may be configured such that sounds 322 appear to originate from simulated speaker positions 346, from one or more objects 348 present in the scene, and/or from additional and/or different positions within three-dimensional space. It will be understood that although the audio output may be audible at many locations within a given environment, the world space ear position(s) 314, recognized as described herein, represent the location(s) where the desired three-dimensional audio effects are realized.

It will be further understood that the configuration of system 300 is presented for the purpose of example, and that a three-dimensional audio system configured to provide three-dimensional audio may include additional and/or different elements without departing from the scope of the present disclosure. FIGS. 1A, 1B, and 5-9 show nonlimiting example embodiments of three-dimensional audio system 300.

Figure 4:
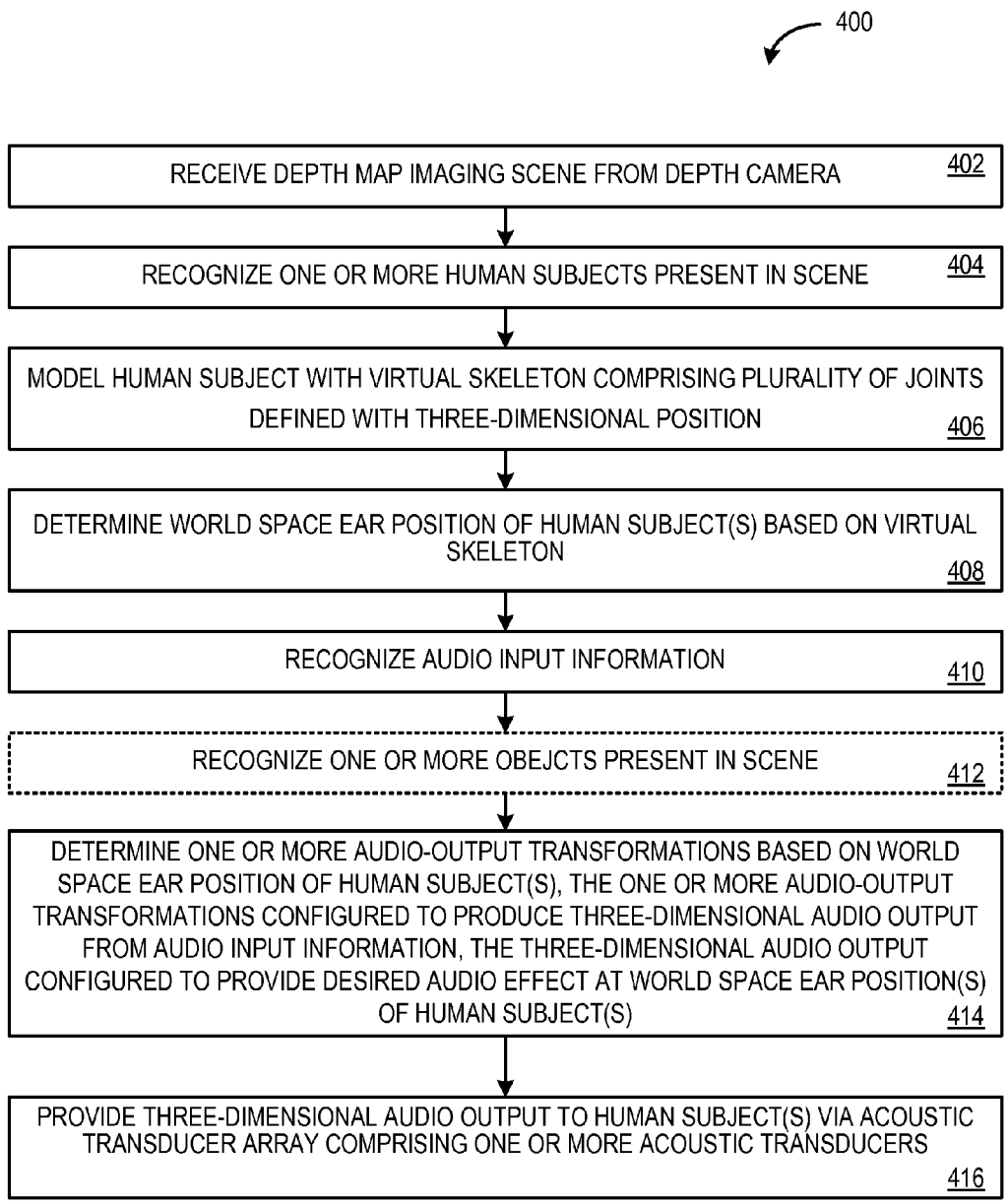
FIG. 4 shows a process flow depicting an embodiment for providing three-dimensional audio.

Turning now to FIG. 4, a process flow depicting an embodiment of a method 400 for providing three-dimensional audio is shown. At 402, method 400 comprises receiving a depth map from one or more depth cameras (e.g., depth sensors 306). Method 400 further comprises, at 404, recognizing one or more human subjects present in the scene. Such recognition may be based on depth information from the depth camera(s) and/or from other information provided by other sensors (e.g., color image sensors 308 and/or acoustic sensors 310).

Figure 5:
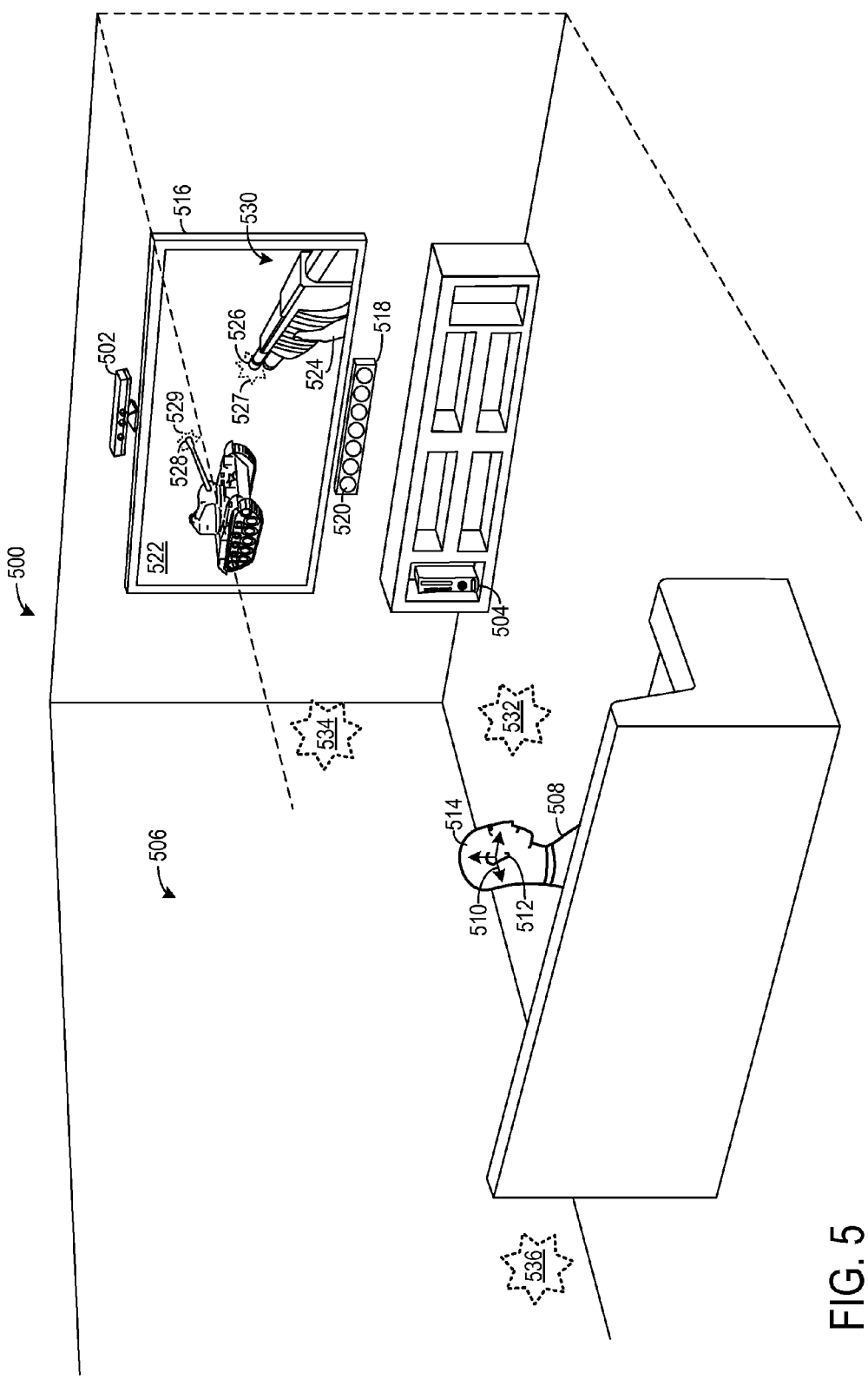
FIGS. 5-9 schematically show nonlimiting examples of three-dimensional audio output scenarios.

Turning briefly to FIG. 5, an example use case scenario for providing three-dimensional audio is shown. FIG. 5 illustrates environment 500 in the form of a living room and comprises tracking device 502 operatively coupled to computing device 504 and imaging scene 506 comprising human subject 508.

Returning to FIG. 4, method 400 comprises, at 406, modeling each of the one or more human subject(s) present in the scene with a virtual skeleton. For example, one or more skeletal tracking pipelines (e.g., skeleton tracking pipeline 26 of FIG. 2) may be utilized to model each of the one or more human subjects with a virtual skeleton comprising a plurality of joints defined with a three-dimensional position. As mentioned above, it will be understood that the "three-dimensional position" of a given joint may include position, orientation, and/or additional information representing the disposition of the joint in world space.

At 408, method 400 further comprises determining a world space ear position of each of the one more human subject(s). For example, in FIG. 5, world space ear position 510 corresponding to the position and/or orientation of one or both ears 512 of human subject 508 in world space. It will be appreciated that such a determination may be provided via any suitable mechanism or combination of mechanisms. For example, in some embodiments, one or more joints of the virtual skeleton (e.g., head and/or neck joint(s)) may be recognized. Using said joints, information (e.g., depth map, infrared information, and/or color information) corresponding to (e.g., in proximity to) said joints may be analyzed in order to determine the world space ear position(s). For example, upon recognizing the joints, each world space ear position may be inferred based on one or more pre-defined head models (e.g., generic and/or user-specific head models). As another example, depth information corresponding to the joints may be used to produce a three-dimensional representation (e.g., three-dimensional surface and/or volume) of head 514 of human subject 508, and thus the world space ear position of one or both ears of each human subject may be determined from the representations. As yet another example, a portion (i.e., one or more pixels) of infrared information and/or color information corresponding to the joints may be identified, and one or more anatomical structures of the human subject(s) (e.g., mouth, ears, nose, etc.) may be recognized in the portion of color information and mapped to the corresponding depth map in order to estimate the world space ear position. Furthermore, the depth map, infrared information, and/or color information at a located ear position optionally may be analyzed to determine pinnae location and shape, outer ear location and shape, and/or ear canal location and shape. Such analysis may facilitate individually customized HRTFs. It will be appreciated that such mechanisms for determining the world space ear position and attributes of each human subject are presented for the purpose of example, and that any suitable mechanism or combination of mechanisms may be usable to determine the world space ear position and attributes without departing from the scope of the present disclosure.

Returning to FIG. 4, method 400 further comprises, at 410, recognizing audio input information, as discussed above with reference to audio input information 320. In some embodiments, method 400 may further comprise recognizing one or more objects present in the scene at 412. Such recognition may be provided by any suitable mechanisms or combination of mechanisms based on information provided by one or more sensors.

Upon recognizing the one or more human subjects and/or the one or more objects present in the scene, method 400 further comprises, at 414, determining one or more audio-output transformations based on the world space ear position of the human subject, wherein the one or more audio-output transformations are configured to produce a three-dimensional audio output from the audio input information. The three-dimensional audio output is configured to provide a desired audio effect at the world space ear position of the human subject (e.g., world space ear position 510 of human subject 508). As mentioned above, it will be appreciated that various three-dimensional audio effects may be provided, and non-limiting examples of such effects will be discussed in detail with reference to FIGS. 5-9. For example, the one or more audio-output transformations may include HRTFs, crosstalk cancellation transformations, and/or additional transformations.

In some embodiments, the one or more audio-output transformations may be at least partially determined based on one or more pre-defined transformations. For example, in some embodiments, the HRTFs may be selected from a plurality of pre-defined, generic HRTFs (e.g., HRTFs based on gender, body size, height, etc.). Such scenarios are presented for the purpose of example, and are not intended to be limiting in any manner.

In other embodiments, the one or more audio-output transformations may be customized for a particular human subject present in a scene. Such customization may be based on the particular ear shape (canal, pinnae, outer ear, etc.) as analyzed from a plurality of depth maps, color images, and/or infrared images taken over time from different orientations. Further, when three-dimensional audio is provided to a plurality of human subjects, one or more user-specific audio transformations (e.g., HRTF) may be at least partially based on the characteristic(s) (e.g., position) of one or more other human subjects.

Method 400 further comprises, at 416, providing a three-dimensional audio output via an acoustic transducer array comprising one or more acoustic transducers to achieve the desired audio effect at the world space ear position of the human subject.

Returning yet again to FIG. 5, computing device 504 is further operatively coupled to display device 516 and to acoustic transducer array 518 comprising one or more acoustic transducers 520. As previously mentioned, it will be understood that although a single human subject 508 is illustrated for the sake of simplicity, tracking device 502 and/or computing device 504 may be configured to track and/or model any suitable number of human subjects and/or objects present in scene 506 without departing from the scope of the present disclosure.

Three-dimensional audio may be output by acoustic transducer array 518 to provide various desired three-dimensional audio effects at the world space ear position of the human subject. For example, in the illustrated example use case scenario of FIG. 5, computing device 504 is shown presenting interactive digital environment 522 (e.g., combat video game environment) comprising user-controlled element 524 (e.g., first-person humanoid character) via display device 516. User-controlled element 524 may be controlled, for example, based on the movement(s) of human subject 508 imaged by tracking device 502, as described above with reference to FIGS. 1A, 1B, and 2. In other embodiments, user-controlled element 524 may be controlled via additional and/or different input devices, including, but not limited to, hand-held game controllers, keyboards, mice, and the like. Although user-controlled element 524 is illustrated as being human-like, it will be appreciated that the term "user-controlled element" refers to any user-controlled element (e.g., vehicle, fantasy character, game perspective, etc.) provided by computing device 504. Furthermore, although user-controlled element 524 is illustrated as being presented via display device 516 in a "first-person" view, it will be appreciated that user-controlled element 524 may comprise any suitable visual representation without departing from the scope of the present disclosure.

In the illustrated example of FIG. 5, interactive digital environment 522 includes virtual space sound source 526 (e.g., weapon muzzle brake of a user-controlled weapon) and virtual space sound source 528 (e.g., tank muzzle brake). As used herein, the term "virtual space sound source" refers to any element (e.g., scenery, user-controlled characters, non-user-controlled characters, etc.) provided by computing device 504 with which sound is programmatically associated (e.g., "originates" from). In other words, each virtual space sound source includes one or more associated sounds such that, during interaction with the virtual environment, one or more of the associated sounds are programmed to be "output" from a particular virtual space sound source. Although virtual space sound sources 526 and 528 are illustrated as each comprising respective visual representations 527 and 529 (e.g., muzzle flashes) presented via display device 516, it will be appreciated that virtual space sound sources may provide sound even when a corresponding visual is not presented via display device 516 (e.g., ambient sounds, sounds originating from "off-screen" characters, etc.).

In order to provide an "immersive" user experience, it may be desirable to provide a three-dimensional audio output via acoustic transducer array 518 such that one or more sounds produced by the one or more virtual space sound sources appear, at world space ear position 510, to originate from corresponding positions in world space. Accordingly, computing device 504 may be configured to determine a virtual space sound source position of each virtual space sound source. As used herein, the term "virtual space sound source position" refers to the position and/or orientation, in virtual space, of a given virtual space sound source.

Furthermore, computing device 504 may be configured to determine virtual space listening position 530 of user-controlled element 524 of interactive digital environment 522. Similar to world space ear position 510 of human subject 508, virtual space listening position 530 refers to the virtual position from which the human subject is to "listen" to the virtual environment. Upon recognizing virtual space listening position 530 and the one or more virtual space sound source positions, it will be appreciated that a spatial relationship between the "ears" of the user-controlled element and each virtual space sound source may be recognized. As mentioned above, it will be appreciated that the user-controlled element may have any suitable configuration, and is not limited to a character comprising one or more auditory mechanisms (e.g., ears). In some embodiments, the user-controlled element may simply be the programmed game perspective from which the user is to experience virtual sounds.

Realizing the immersive experience may include providing audio output via acoustic transducer array 518 such that the sounds provided by virtual space sound sources 526 and 528 appear to originate from world space sound source positions 532 and 534, respectively. As used herein, the term "world space sound source position" refers to a position in world space from which one or more sounds of a given virtual space sound source appear, at the one or more world space ear position(s), to originate. In some embodiments, computing device 504 may be configured to provide interactive digital environment 522 via a plurality of "frames" (e.g., 30 frames per second). Accordingly, it will be appreciated that audio output may be provided on a per-frame basis via acoustic transducer array 518. For example, computing device 504 may be configured to determine/update the world space sound source position of each virtual space sound source at each frame, and thus to provide per-frame information comprising the sound(s) (e.g., via "mixing" the one or more sounds) to acoustic transducer array 518. Such scenarios are presented for the purpose of example, and are not intended to be limiting in any manner.

Generally speaking, computing device 504 may be configured to, for each of the virtual space sound sources, determine a world space sound source position such that a relative spatial relationship between the world space sound source position and the world space ear position "models" a relative spatial relationship between a virtual space sound source position of the virtual space sound source and the virtual space listening position. For example, world space sound source positions 532 and 534 are illustrated as directly corresponding to the respective virtual space sound source positions (i.e., world space sound source position 532 is the same relative "distance" forward and right of human subject 508 as virtual space sound source 526 is from user-controlled element 524). However, it will be appreciated that other modeling may be possible. As mentioned above, various virtual space sound sources may be provided by computing device 504 that do not correspond to visuals presented via display device 516, such as "off-screen" sound sources and/or ambient sound sources. For example, world space sound source position 536 may correspond to such virtual space sound sources. However, it will be appreciated that, as user-controlled element 524 navigates environment 522, the virtual space sound sources may change position relative to user-controlled element 524 such that a particular virtual space sound source may include corresponding visuals in a first portion of environment 522 while not including corresponding visuals in a second portion of environment 522. It will be appreciated that these scenarios are presented for the purpose of example and that computing device 504 may be configured to model said spatial relationships via any suitable mechanism or combination of mechanisms without departing from the scope of the present disclosure.

Figure 6:
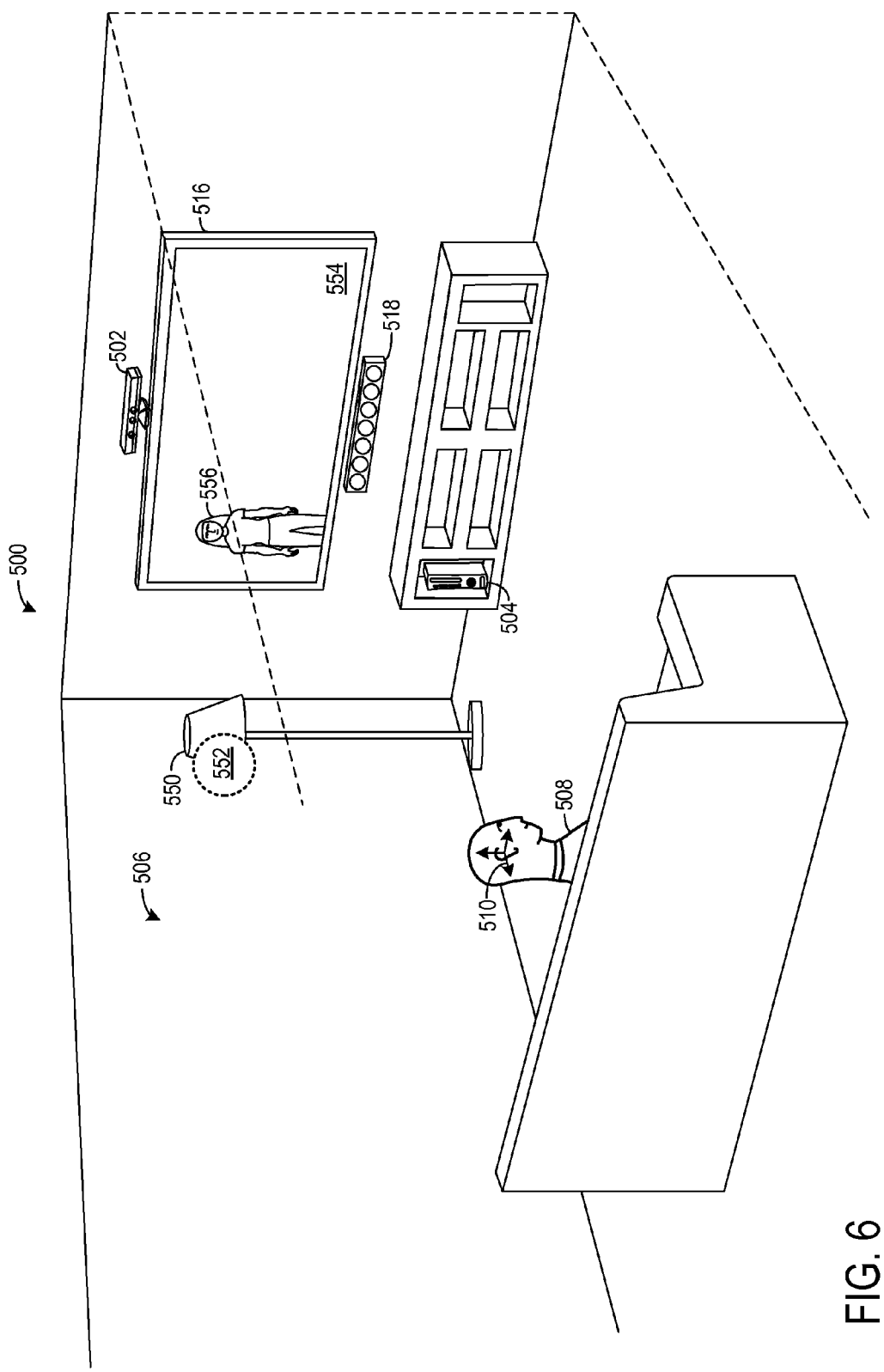

Turning now to FIG. 6, an example use case scenario comprising a second three-dimensional audio effect is presented. In contrast to the example of FIG. 5, FIG. 6 further includes object 550 (e.g., floor lamp). As such, in addition to tracking/modeling of human subject 508 and/or additional human subjects, computing device 504 and/or tracking device 502 may be further configured to recognize one or more objects (e.g., object 550) present in scene 506.

Upon recognizing object(s) 550, computing device 504 may be configured to provide audio output via acoustic transducer array 518 such that a sound appears, at world space ear position 510, to originate from the object(s). As one example, computing device 504 may be configured to determine world space object position 552 of object 550 such that sound appears to originate from world space object position 552 of object 550 (e.g., a talking lamp). The three-dimensional audio effect illustrated in FIG. 6 may or may not correspond to visuals 554 (e.g., virtual object/character 556) presented via display device 516.

Although the use case scenario of FIG. 6 has been described with reference to providing audio output by which sound appears to originate from objects (e.g., object 550), it will be appreciated that other configurations are possible. For example, in some embodiments, the one or more "objects" may include one or more anatomical structures (e.g., limbs) of human subject 508 such that sound appears to originate from the anatomical structure(s). Furthermore, although object 550 and human subject 508 are illustrated as being stationary, it will be appreciated from the preceding discussion that computing device 504 and/or tracking device 502 may be configured to tack object 550 and/or human subject 508 as they move about the environment. It will therefore be appreciated that computing device 504 may be configured to provide audio output via acoustic transducer array 518 such that the world space sound source position(s) "track" the moving position of object 550 and/or human subject 508.

As previously mentioned with reference to FIG. 3, it will be appreciated that, in some embodiments, audio input information may comprise multichannel audio information. As one nonlimiting example, typical DVD players may be configured to output six-channel audio, sometimes referred to as "5.1" audio. Furthermore, in some embodiments, interactive digital environments (e.g., environment 522 of FIG. 5) provided by computing device 504 may be configured to provide multichannel audio input information.

Figure 7:
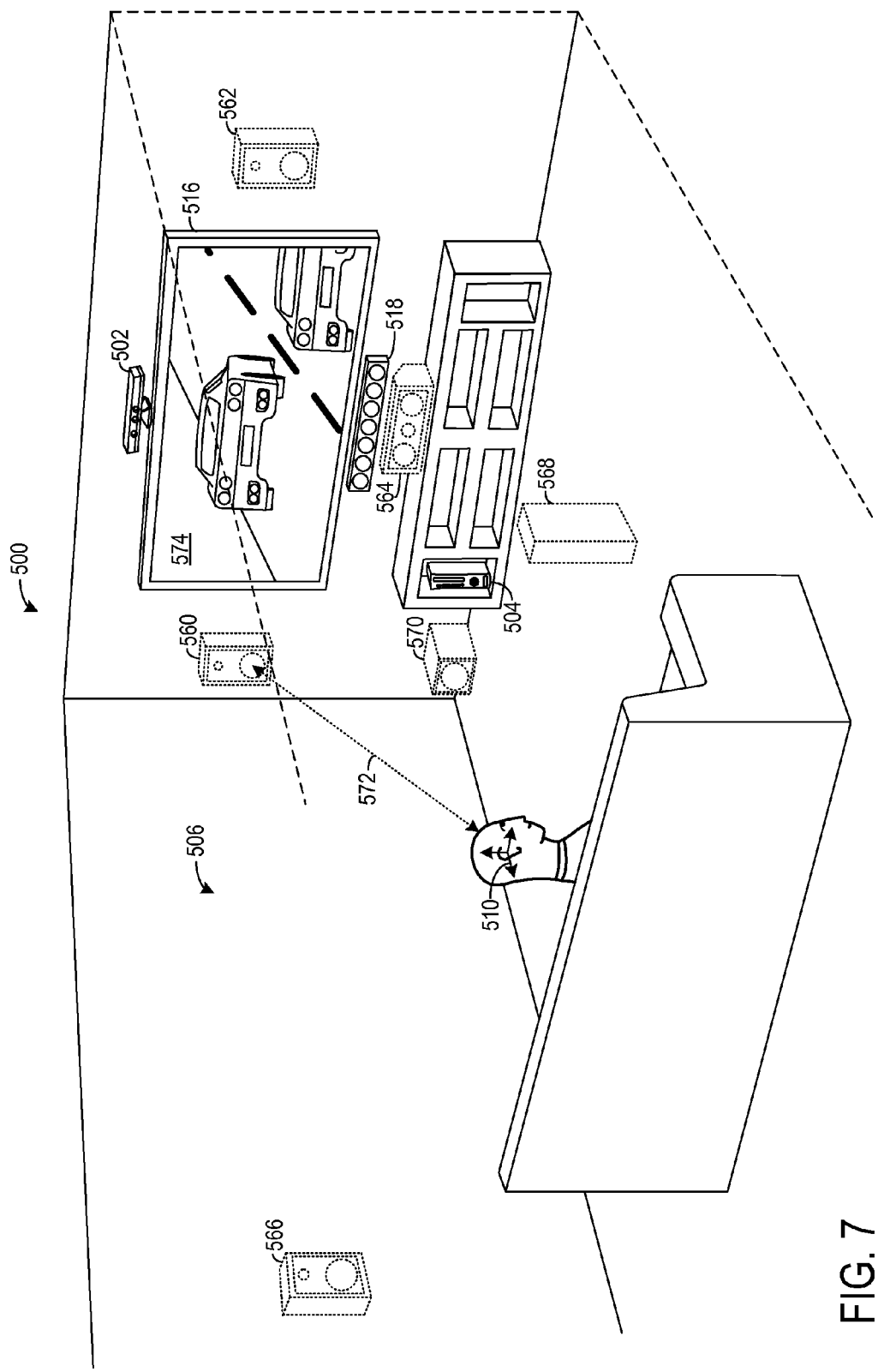

Accordingly, turning now to FIG. 7, a third example use case scenario utilizing multichannel audio input information is illustrated. Typical multichannel audio information (e.g., stereo, 5.1, 7.1, etc.) includes a plurality of discrete audio channels, each discrete audio channel encoding channel-specific sounds corresponding to a "standard" (e.g., pre-defined and/or preferred) speaker-to-listener orientation. In other words, typical multichannel audio information is encoded under the assumption that the encoded information will be reproduced via loudspeaker(s) positioned according to such speaker-to-listener orientations. For example, typical "front" channels of multichannel audio input information are configured to be provided from loudspeakers positioned at 30 degrees from the user. However, due to various considerations (e.g., room layout, etc.) such orientations may not be possible.

Accordingly, based on the preceding discussion, it will be appreciated that tracking device 502 and/or computing device 504 may be configured to provide an audio output via acoustic transducer array 518 to "simulate" speaker(s) positioned at the one or more "standard" speaker-to-listener orientations. In the illustrated example of FIG. 7, the audio output provided via acoustic transducer array 518 is configured to simulate six-channel (e.g., 5.1) audio reproduction of six-channel audio information comprising any combination of unidirectional (e.g., high-frequency and/or mid-frequency) and/or omnidirectional sounds (e.g., low-frequency). Specifically, the example audio output may be provided such that sound appears to originate from simulated world speaker positions 560 (e.g., front left), 562 (e.g., front right), 564 (e.g., front center), 566 (e.g., surround left), 568 (e.g., surround right), and 570 (e.g., subwoofer).

As such, computing device 504 may be configured to determine the simulated world space speaker position for each discrete audio channel of the plurality of discrete audio channels based on the corresponding standard speaker-to-listener orientation and on world space ear position 510. For example, simulated world space speaker position 560 may be determined based on standard speaker-to-listener orientation 572 corresponding to the "front left" audio channel. Although referred to as "speaker-to-listener orientations," it will be understood that the scenarios are presented for the purpose of example and that the "standard" speaker position(s) corresponding to a given audio channel may be defined via any suitable information (e.g., one or more vectors) relative to any one or more suitable reference points (e.g., world space ear position 510, centroid of display device 516, etc.).

In some embodiments, the multichannel audio input information may correspond to visuals 574 displayed via display device 516. For example, as mentioned above, the multichannel audio input information may correspond to an interactive digital experience (e.g., video game) provided by computing device 504, media content (e.g., recorded and/or live audiovisual content) provided by computing device 504, and/or any other suitable visuals (e.g., output from a discrete DVD player) having corresponding audio input information received by computing device 504 and/or tracking device 502.

It will be appreciated from the preceding discussion that, as illustrated via world space ear position 510, the above-described example three-dimensional audio effects may be recognizable at one or more discrete locations, referred to as "sweet spots". In other words, such sweet spots are locations within world space where a suitable three-dimensional audio experience may be provided. In some environments, step 414 of FIG. 4 may be used to produce a desired audio effect at many different positions. However, room conditions, speaker options, human characteristics, and/or other variables may limit the number of locations at which a desired audio effect can be achieved. Further, in some environments, although a desired audio effect may be achieved at various locations, the effect may be achieved with increased realism at one or more particular sweet spots.

Figure 8:
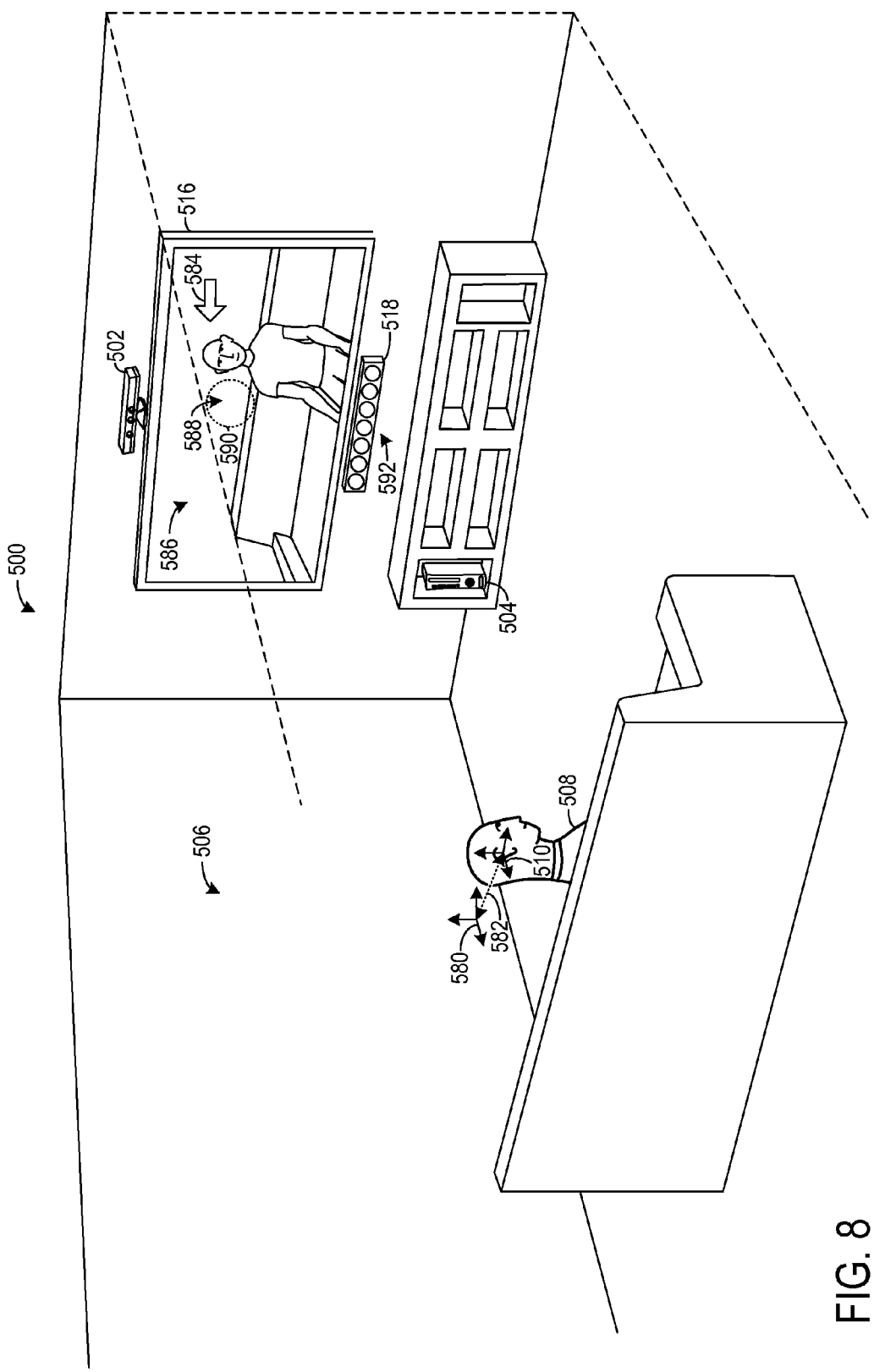

With this in mind, FIG. 8 illustrates another use case scenario where human subject 508 is made aware of such a "sweet spot." Accordingly, in order to provide the desired audio effect(s), one or more target world space ear positions 580 may be determined via information provided by tracking device 502. For example, one or more characteristics of environment 500 (e.g., dimensions, layout, materials, etc.) may be determined via the one or more sensors of tracking device 502 or via another suitable mechanism such as manual input, and the one or more target world space ear positions 580 may be determined from said characteristic(s). It will be appreciated that these scenarios are presented for the purpose of example and that the target world space ear position(s) may be determined via any suitable mechanism or combination of mechanisms without departing from the scope of the present disclosure.

Upon determination of target world space ear position 580, computing device 504 may be configured to output a notification representing a spatial relationship 582 between world space ear position 510 and target world space ear position 580. In this way, the notification either directs human subject to the target world space ear position if the world space ear position is not proximate to the target world space ear position or alerts the human subject that the world space ear position is proximate to the target world space ear position. In some embodiments, upon being positioned proximate target world space ear position 580, computing device 504 may be configured to determine one or more audio-output transformations (e.g., HRTF) based on the target world space position or determine the target world space ear position based on the one or more audio-output transformations. In this way, computing device 504 may be configured to "fine-tune" the three-dimensional audio output once the human subject is in a suitable position.

It will be appreciated that the notification may be provided via any suitable mechanism or combination of mechanisms. For example, in some embodiments, the notification may comprise a visual notification displayed via display device 516. Such visual notifications may comprise, for example, directional indicators 584 (e.g., arrows, etc.) based on spatial relationship 582 between world space ear position 510 and target world space ear position 580. In other words, the directional indicator(s) may "point" human subject 508 in the direction of target world space ear position(s) 580. However, other configurations are possible without departing from the scope of the present disclosure.

For example, in some embodiments, representation 586 of scene 506 based on information provide by tracking device 502 may be displayed via display device 516. Representation 586 may include, for example, color information received from one or more color image sensors, a geometric model based on a depth map received from a depth camera, and/or any other suitable representation. In such embodiments, the visual notification may be concurrently displayed in spatial registration with target virtual world space ear position 588 corresponding to target world space ear position 580. For example, in some embodiments, the visual notification may comprise an overlay 590 in spatial registration with, and/or substantially coextensive with, target virtual space ear position 588. Although overlay 590 is illustrated as comprising a geometric outline (e.g., circle), it will be appreciated that overlay 590 may have any suitable configuration. For example, in some embodiments, overlay 590 may comprise a "heat map" representing a "quality" of a given world space ear position, though it will be appreciated that visual notifications may have other configurations without departing from the scope of the present disclosure.

It will be further appreciated that notifications may include non-visual notifications. For example, in some embodiments, an audio notification may be provided via acoustic transducer array 518 and/or via other audio output devices. Such audio notifications may comprise, for example, recorded audio (e.g., recorded voice instructions, "notification sounds", etc.), generated speech, and/or any other suitable audio information. In yet other embodiments, notifications may be provided via additional and/or different mechanisms (e.g., one or more haptic feedback mechanisms, etc.).

As briefly mentioned above with reference to FIG. 3, it may be desirable to determine world space transducer position 592 of acoustic transducer array 518 in order to provide a suitable three-dimensional audio effect. As such, it will be appreciated that information from tracking device 502 may be further usable to determine the world space transducer position via various mechanisms or combination of mechanisms. For example, in some embodiments, the world space transducer position may be determined by recognizing acoustic transducer array 518 via visual information provided by tracking device 502 (e.g., depth map from depth sensor(s) 306 and/or color information from color image sensor(s) 308). This may be accomplished by recognizing the transducer in the scene and/or instructing the human subject to touch the transducer so that the virtual skeleton may be used to identify the transducer. As mentioned above the acoustic transducer array may comprise a plurality of discrete devices in some embodiments, and therefore the world space transducer position may be determined for each discrete device.

Furthermore, in some embodiments, audio information from one or more acoustic sensors may be used. For example, in such embodiments, the world space transducer position may be determined by providing calibration audio output (e.g., "test tones", white noise, music, etc.) to acoustic transducer array 518 and subsequently receiving acoustic sensor information representing the calibration audio output from the one or more acoustic sensors. In other words, the acoustic sensor information may include a delayed representation of the calibration audio information as detected by the acoustic sensor(s). As such, using the differences (e.g., time delay, intensity difference, component harmonics, etc.) between the calibration audio output and the acoustic sensor information, the world space transducer position may be determined relative to the acoustic sensors. Further, the world space position of the acoustic sensors may be determined via visual modeling, user input, and/or sensor reporting, thus providing information to determine the nonrelative world space position of the transducer(s). It will be appreciated that these scenarios are presented for the purpose of example, and are not intended to be limiting in any manner. For example, in some embodiments, such acoustic detection may be determined via audio output provided during "normal" use of the computing device 504 (e.g., during video game play).

Although environment 500 of the preceding examples includes physically separate, though operatively coupled, tracking device 502 and acoustic transducer array 518, it will be appreciated that the respective functionalities may be provided within a single housing. For example, such a configuration may substantially reduce any ambiguity in the world space transducer position, and thus may provide a more satisfactory three-dimensional audio output.

Figure 9:
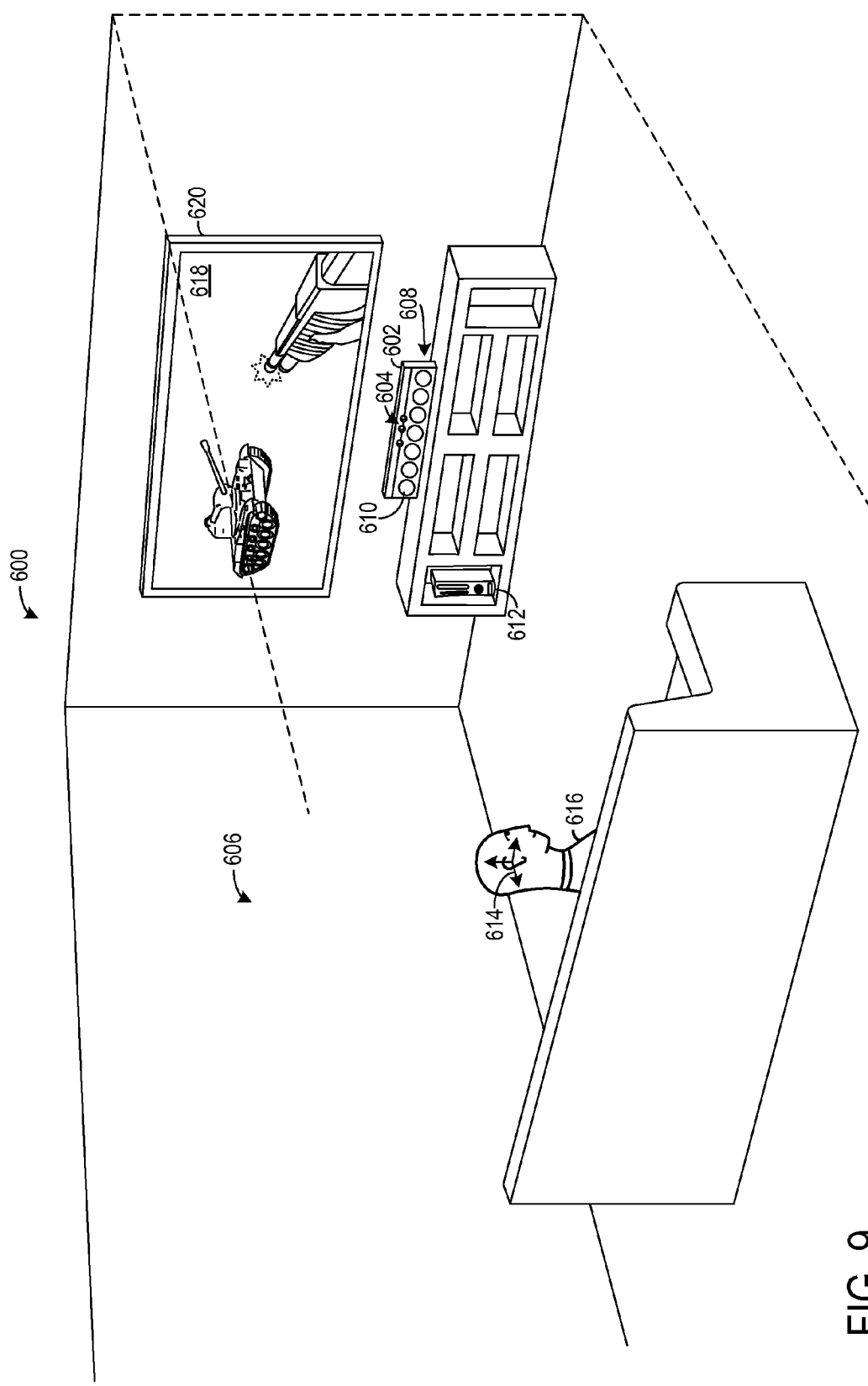
Figure 10:
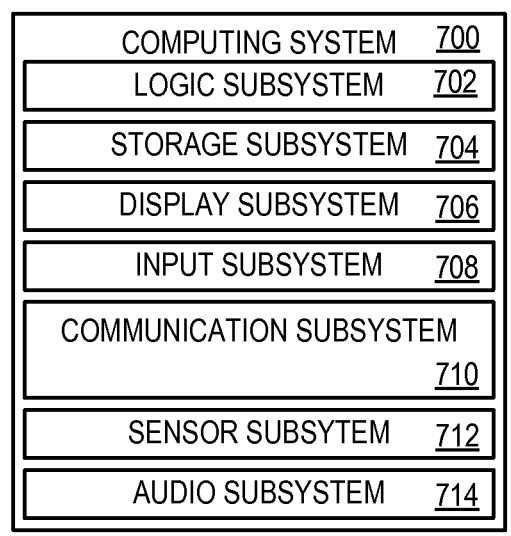
FIG. 10 schematically shows a non-limiting example of a computing system for providing three-dimensional audio.

As such, turning now to FIG. 9, environment 600 is shown comprising housing 602 including tracking device 604 and acoustic transducer array 608 housed by housing 602. For example, in some embodiments, housing 602 may form one or more cavities in which tracking device 604 configured to image scene 606, acoustic transducer(s) 610 of acoustic transducer array 608, and/or additional elements (e.g., an audio placement system, such as audio placement system 330 of FIG. 3), in whole or in part, are oriented. Housing 602 may comprise a plurality of individual pieces mechanically coupled to form housing 602 (e.g., individual pieces may be coupled using adhesive, screws, snap-together pressure fittings, etc.). It will be understood that housing 602, and/or the components thereof, may be configured to provide a desired audio effect at world space ear position 614 of human subject 616 and/or at the world space ear position(s) of one or more other human subjects present in scene 606. In some embodiments, computing device 612 and/or one or more elements housed by housing 602 may be further configured to provide visuals 618 via display device 620.

In some embodiments, the methods and processes described above may be tied to a computing system of one or more computing devices. In particular, such methods and processes may be implemented as a computer-application program or service, an application-programming interface (API), a library, and/or other computer-program product.

FIG. 7 schematically shows a non-limiting embodiment of a computing system 700 that can perform one or more of the methods and processes described above. Computing system 700 is shown in simplified form. Computing devices 504 and 612; three-dimensional audio system 300; and depth analysis system 10 are non-limiting examples of computing system 700. It will be understood that virtually any computer architecture may be used without departing from the scope of this disclosure. In different embodiments, computing system 700 may take the form of a mainframe computer, server computer, desktop computer, laptop computer, tablet computer, home-entertainment computer, network computing device, gaming system, mobile computing device, mobile communication device (e.g., smart phone), etc. In some embodiments, the computing system may include integrated tracking devices and/or acoustic transducer arrays.

Computing system 700 includes a logic subsystem 702 and a storage subsystem 704. Computing system 700 may optionally include a display subsystem 706, input-device subsystem 708, communication subsystem 710, sensor subsystem 712 (analogous to observation system 302 of FIG. 3), audio subsystem (analogous to acoustic transducer array 342) and/or other components not shown in FIG. 7. Computing system 700 may also optionally include or interface with one or more user-input devices such as a keyboard, mouse, game controller, camera, microphone, and/or touch screen, for example. Such user-input devices may form part of input-device subsystem 708 or may interface with input-device subsystem 708.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 704 includes one or more physical, non-transitory, devices configured to hold data and/or instructions executable by the logic subsystem to implement the herein-described methods and processes. When such methods and processes are implemented, the state of storage subsystem 704 may be transformed—e.g., to hold different data.

Storage subsystem 704 may include removable media and/or built-in devices. Storage subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices. In some embodiments, logic subsystem 702 and storage subsystem 704 may be integrated into one or more unitary devices, such as an application-specific integrated circuit (ASIC), or a system-on-a-chip.

It will be appreciated that storage subsystem 704 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

The terms "pipeline" and "application" may be used to describe an aspect of computing system 700 implemented to perform a particular function. In some cases, a pipeline or application may be instantiated via logic subsystem 702 executing instructions held by storage subsystem 704. It will be understood that different pipelines and/or applications may be instantiated from the same service, code block, object, library, routine, API, function, etc. Likewise, the same pipeline and/or application may be instantiated by different services, code blocks, objects, routines, APIs, functions, etc. The terms "pipeline" and "application" may encompass individual or groups of executable files, data files, libraries, drivers, scripts, database records, etc.

When included, display subsystem 706 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for providing three-dimensional audio, comprising:
   receiving a depth map imaging a scene from a depth camera;
   recognizing a human subject present in the scene;
   modeling the human subject with a virtual skeleton comprising a plurality of joints defined with a three-dimensional position;
   determining, based on the virtual skeleton, a world space ear position of the human subject;
   determining a target world space ear position of the human subject where a desired audio effect is produced via an acoustic transducer array; and
   visually indicating a three-dimensional spatial relationship between the world space ear position and the target world space ear position.

2. The method of claim 1, wherein the visual indication directs the human subject to the target world space ear position if the world space ear position is not proximate to the target world space ear position.

3. The method of claim 1, wherein the visual indication alerts the human subject that the world space ear position is proximate to the target world space ear position.

4. The method of claim 1, wherein visually indicating the three-dimensional spatial relationship comprises displaying a representation of the target world space ear position via a display device.

5. The method of claim 4, further comprising:
   displaying a representation of the scene via the display device; and
   concurrently displaying the visual indication in spatial registration with a target virtual space ear position in virtual space corresponding to the target world space ear position in world space.

6. The method of claim 5, wherein the representation of the scene includes a color model of the scene based on color information received from one or more color image sensors.

7. The method of claim 5, wherein the representation of the scene includes a geometric model of the scene based on the depth map received from the depth camera.

8. The method of claim 5, wherein the representation of the visual indication comprises an overlay.

9. The method of claim 5, wherein the visual indication comprises one or more directional indicators based on the spatial relationship between the human subject and the target world space ear position.

10. The method of claim 1, further comprising outputting an audio notification of the spatial relationship to the acoustic transducer array.

11. The method of claim 1, further comprising, when the human subject is proximate the target world space ear position:
    recognizing one or more joints of the virtual skeleton;
    recognizing depth information in the depth map that corresponds to a head of the human subject based on the one or more joints; and
    calculating a head-related transfer function (HRTF) based on the depth information; and
    wherein determining the target world space ear position of the human subject includes determining the target world space ear position based on the HRTF.

12. The method of claim 1, further comprising:
    determining a world space transducer position of the acoustic transducer array; and
    determining a crosstalk cancellation transformation based on a spatial relationship between the world space transducer position and the world space ear position.

13. The method of claim 12, wherein determining the world space transducer position comprises:
    providing calibration audio to the acoustic transducer array;
    receiving acoustic sensor information from one or more acoustic sensors during output of the calibration audio by the acoustic transducer array; and
    identifying the world space transducer position based on the output calibration audio and the acoustic sensor information.

14. The method of claim 12, wherein determining the world space transducer position comprises recognizing the acoustic transducer array via one or more of the depth map and color information imaging the scene.

15. A three-dimensional audio system, comprising:
    a depth camera input to receive a depth map imaging a scene from one or more depth cameras;
    an audio input to receive audio input information;
    an audio output to provide three-dimensional audio output information to an acoustic transducer array comprising one or more acoustic transducers;
    a logic subsystem; and
    a storage subsystem storing instructions that are executable by the logic subsystem to:
    receive the depth map;
    recognize a human subject present in the scene;
    model the human subject with a virtual skeleton comprising a plurality of joints defined with a three-dimensional position;
    determine, based on the virtual skeleton, a world space ear position of the human subject;
    determine a target world space ear position of the human subject where a desired audio effect is produced via the acoustic transducer array; and
    output a notification representing a three-dimensional spatial relationship between the world space ear position and the target world space ear position.

16. The three-dimensional audio system of claim 15, wherein determining the target world space ear position of the human subject comprises:
    recognizing one or more joints of the virtual skeleton;
    recognizing depth information in the depth map that corresponds to a head of the human subject based on the one or more joints;
    determining one or more audio-output transformations based on the depth information; and
    determining the target world space ear position based on the one or more audio-output transformations.

17. The three-dimensional audio system of claim 16, wherein the one or more audio-output transformations include a crosstalk cancellation transformation.

18. The three-dimensional audio system of claim 16, wherein the instructions are further executable to receive color information imaging the scene from one or more color image sensors, wherein the one or more audio-output transformations are further based on the color information.

19. A method for providing three-dimensional audio, comprising:
    receiving a depth map imaging a scene from a depth camera;
    recognizing a human subject present in the scene;
    modeling the human subject with a virtual skeleton comprising a plurality of joints defined with a three-dimensional position;

determining, based on the virtual skeleton, a world space ear position of the human subject;

determine, based on the world space ear position, one or more audio-output transformations configured to produce the desired audio effect from audio input information, the one or more audio-output transformations comprising a head-related transfer function (HRTF) and a crosstalk cancellation transformation;

determining a target world space ear position of the human subject where a desired audio effect is produced via an acoustic transducer array; and visually indicating a three-dimensional spatial relationship between the world space ear position and the target world space ear position.

20. The method of claim 19, wherein visually indicating comprises:

displaying a visual notification via a display device, responsive to the world space ear position of the human subject moving to the target world space ear position, determining, based on the moved world space ear position, one or more additional audio-output transformations configured to produce the desired audio effect from audio input information, and providing the desired audio effect to the human subject via three-dimensional audio output from the acoustic transducer array.

* * * * *